(12) United States Patent
Muthuraman et al.

(10) Patent No.: US 12,493,124 B2
(45) Date of Patent: Dec. 9, 2025

(54) SATELLITE POSITIONING FOR SATELLITE-BASED COMMUNICATIONS

(71) Applicant: QUALCOMM Incorporated, San Diego, CA (US)

(72) Inventors: Kannan Muthuraman, Mission Viejo, CA (US); Francesco Grilli, La Jolla, CA (US); Moi Riba, San Ramon, CA (US); Prashant Kumar Singh, Gautam Budh Nagar (IN); Ricky Tai, Milpitas, CA (US); Ronald Blumstein, San Jose, CA (US); Gurdarshan Singh, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/818,126

(22) Filed: Aug. 8, 2022

(65) Prior Publication Data

US 2024/0045079 A1    Feb. 8, 2024

(51) Int. Cl.
*G01S 19/25*    (2010.01)
(52) U.S. Cl.
CPC .................. *G01S 19/258* (2013.01)
(58) Field of Classification Search
USPC .................................................... 342/357.66
See application file for complete search history.

(56) References Cited

U.S. PATENT DOCUMENTS

| | | | |
|---|---|---|---|
| 5,347,286 A | 9/1994 | Babitch | |
| 5,666,563 A | 9/1997 | Iijima et al. | |
| 5,864,316 A | 1/1999 | Bradley et al. | |
| 5,946,603 A | 8/1999 | Ibanez-Meier et al. | |
| 6,023,242 A | 2/2000 | Dixon | |
| 6,070,051 A | 5/2000 | Astrom et al. | |

(Continued)

FOREIGN PATENT DOCUMENTS

| | | |
|---|---|---|
| CA | 2633051 A1 | 11/2009 |
| CN | 101304582 A | 11/2008 |

(Continued)

OTHER PUBLICATIONS

International Search Report and Written Opinion—PCT/US2023/023073—ISA/EPO—dated Sep. 18, 2023.

(Continued)

*Primary Examiner* — Michael W Justice
(74) *Attorney, Agent, or Firm* — Thien T. Nguyen

(57) ABSTRACT

In some implementations, a method of facilitating pointing of a mobile device at a satellite of a satellite constellation for satellite-based data communication, may comprise obtaining, at a first time point, historical orbital data indicative of orbital movement of a plurality of satellites of a satellite constellation over a period of time. The method may also comprise assigning a reference orbital dataset of the plurality orbital datasets determined at a reference time point to corresponding control boxes of a reference grid covering the satellite constellation, wherein each control box of the reference grid corresponds to a satellite of the satellite constellation. The method may also comprise mapping the plurality orbital datasets to the reference grid for an orbital model based on the assignment of the reference orbital dataset.

34 Claims, 12 Drawing Sheets

(56) References Cited

U.S. PATENT DOCUMENTS

| | | | |
|---|---|---|---|
| 6,107,959 A | 8/2000 | Levanon | |
| 6,272,316 B1 | 8/2001 | Wiedeman et al. | |
| 6,539,200 B1* | 3/2003 | Schiff | H04B 7/18567 |
| | | | 455/433 |
| 6,829,534 B2* | 12/2004 | Fuchs | G01S 19/254 |
| | | | 342/357.66 |
| 7,158,080 B2* | 1/2007 | van Diggelen | G01S 19/27 |
| | | | 342/357.42 |
| 7,595,752 B2* | 9/2009 | van Diggelen | G01S 19/42 |
| | | | 342/357.42 |
| 7,719,464 B2* | 5/2010 | Pande | G01S 19/37 |
| | | | 342/357.31 |
| 7,839,324 B2* | 11/2010 | Phatak | G01S 19/258 |
| | | | 342/357.66 |
| 7,944,395 B1* | 5/2011 | Curticapean | G01S 19/40 |
| | | | 342/357.65 |
| 8,099,103 B2* | 1/2012 | Sung | H04W 8/08 |
| | | | 455/456.2 |
| 8,134,500 B2* | 3/2012 | van Diggelen | G01S 19/05 |
| | | | 342/357.42 |
| 8,238,903 B2* | 8/2012 | Korb | B64G 1/1085 |
| | | | 455/205 |
| 8,259,011 B2* | 9/2012 | McBurney | G01S 19/05 |
| | | | 701/531 |
| 8,480,036 B2* | 7/2013 | Korb | B64G 1/2427 |
| | | | 455/12.1 |
| 8,643,541 B2* | 2/2014 | Van Diggelen | G01S 19/42 |
| | | | 342/357.42 |
| 8,649,800 B2 | 2/2014 | Kalliola et al. | |
| RE45,545 E* | 6/2015 | Sung | H04W 4/20 |
| 9,503,177 B1 | 11/2016 | Shi et al. | |
| 9,629,171 B2 | 4/2017 | Roy et al. | |
| 9,893,799 B2 | 2/2018 | Reis | |
| 10,359,496 B2 | 7/2019 | Zlogar et al. | |
| 10,564,292 B2 | 2/2020 | Rautalin et al. | |
| 10,849,034 B1 | 11/2020 | Chisu et al. | |
| 10,924,180 B2 | 2/2021 | Bournes | |
| 11,096,188 B1 | 8/2021 | Vasisht et al. | |
| 11,294,096 B2* | 4/2022 | Elkabetz | G08G 5/55 |
| 11,811,432 B2* | 11/2023 | Edge | H04B 7/18513 |
| 11,997,593 B2* | 5/2024 | Liberg | G01S 19/254 |
| 12,063,099 B2* | 8/2024 | Xu | H04B 7/18541 |
| 2002/0190898 A1* | 12/2002 | Abraham | G01S 19/05 |
| | | | 342/357.43 |
| 2003/0029969 A1* | 2/2003 | Turner | B64G 1/2427 |
| | | | 244/158.9 |
| 2003/0058161 A1 | 3/2003 | Ring | |
| 2003/0100333 A1 | 5/2003 | Standke et al. | |
| 2003/0122706 A1 | 7/2003 | Choi et al. | |
| 2003/0151547 A1 | 8/2003 | Mauro et al. | |
| 2003/0154025 A1* | 8/2003 | Fuchs | G01S 19/072 |
| | | | 342/357.66 |
| 2004/0117114 A1* | 6/2004 | Diggelen | G01S 19/27 |
| | | | 701/13 |
| 2005/0104772 A1* | 5/2005 | Diggelen | G01S 19/08 |
| | | | 342/357.45 |
| 2005/0212700 A1* | 9/2005 | Diggelen | G01S 19/05 |
| | | | 342/357.42 |
| 2007/0103365 A1* | 5/2007 | Pande | G01S 19/05 |
| | | | 342/357.77 |
| 2008/0150796 A1* | 6/2008 | Syrjarinne | G01S 19/074 |
| | | | 342/357.77 |
| 2008/0191936 A1* | 8/2008 | Phatak | G01S 19/05 |
| | | | 342/357.42 |
| 2008/0303715 A1 | 12/2008 | Wang et al. | |
| 2009/0309794 A1* | 12/2009 | Diggelen | G01S 19/27 |
| | | | 342/357.42 |
| 2010/0311417 A1* | 12/2010 | Korb | B06F 11/3409 |
| | | | 703/2 |
| 2011/0136500 A1* | 6/2011 | Sung | H04W 64/00 |
| | | | 455/456.1 |
| 2011/0234456 A1* | 9/2011 | McBurney | G01S 19/27 |
| | | | 342/357.42 |
| 2011/0291902 A1 | 12/2011 | Bafrooei et al. | |
| 2012/0182179 A1* | 7/2012 | Bamberger | G01S 19/40 |
| | | | 342/357.23 |
| 2012/0229335 A1* | 9/2012 | Van Diggelen | G01S 19/05 |
| | | | 342/357.42 |
| 2012/0273621 A1* | 11/2012 | Korb | H04B 7/1853 |
| | | | 244/158.4 |
| 2013/0135146 A1 | 5/2013 | Ransom et al. | |
| 2014/0113681 A1 | 4/2014 | Reis et al. | |
| 2014/0132447 A1* | 5/2014 | Derbez | G01S 19/27 |
| | | | 342/357.66 |
| 2014/0152505 A1 | 6/2014 | Kim et al. | |
| 2014/0269376 A1 | 9/2014 | Garcia et al. | |
| 2015/0006099 A1 | 1/2015 | Pham et al. | |
| 2017/0006620 A1 | 1/2017 | Reis | |
| 2017/0026110 A1 | 1/2017 | Richardson et al. | |
| 2017/0085314 A1 | 3/2017 | Davis | |
| 2017/0150371 A1 | 5/2017 | Cichonski | |
| 2017/0310382 A1 | 10/2017 | Darby, III | |
| 2017/0331170 A1 | 11/2017 | Trerise | |
| 2018/0100932 A1 | 4/2018 | Draaijer et al. | |
| 2018/0206109 A1* | 7/2018 | Bitra | H04W 4/02 |
| 2018/0270000 A1 | 9/2018 | Reis et al. | |
| 2018/0316401 A1 | 11/2018 | Reis et al. | |
| 2018/0316416 A1 | 11/2018 | Reis et al. | |
| 2018/0316885 A1 | 11/2018 | Reis et al. | |
| 2018/0367212 A1 | 12/2018 | Reis et al. | |
| 2019/0339416 A1* | 11/2019 | Elkabetz | G01W 1/02 |
| 2020/0007209 A1 | 1/2020 | Kang | |
| 2020/0044725 A1 | 2/2020 | Breynaert et al. | |
| 2020/0204250 A1 | 6/2020 | Ravishankar et al. | |
| 2021/0051619 A1 | 2/2021 | Gulati et al. | |
| 2021/0124057 A1 | 4/2021 | Luo et al. | |
| 2021/0242934 A1 | 8/2021 | Qiao et al. | |
| 2021/0311157 A1 | 10/2021 | Takahashi | |
| 2022/0150818 A1 | 5/2022 | Liberg | G01S 19/254 |
| 2022/0182892 A1* | 6/2022 | Chen | H04W 36/324 |
| 2022/0291394 A1* | 9/2022 | Lee | H04W 48/12 |
| 2022/0390618 A1 | 12/2022 | Lavi et al. | |
| 2022/0393779 A1 | 12/2022 | Garrigues et al. | |
| 2023/0024479 A1* | 1/2023 | Ciochina | H04B 7/18541 |
| 2023/0063173 A1 | 3/2023 | Caro et al. | |
| 2023/0065219 A1 | 3/2023 | Caro et al. | |
| 2023/0066232 A1 | 3/2023 | Caro et al. | |
| 2023/0079636 A1* | 3/2023 | Edge | H04W 60/04 |
| | | | 370/316 |
| 2023/0261738 A1* | 8/2023 | Xu | H04W 68/02 |
| | | | 370/316 |
| 2023/0336856 A1 | 10/2023 | Park et al. | |
| 2024/0022321 A1 | 1/2024 | Muthuraman et al. | |
| 2024/0048651 A1 | 2/2024 | Lin et al. | |
| 2024/0063893 A1 | 2/2024 | Grilli et al. | |
| 2024/0063894 A1* | 2/2024 | Vogedes | H04B 7/18541 |
| 2024/0063928 A1 | 2/2024 | Bhawnani et al. | |
| 2024/0072887 A1 | 2/2024 | Xiong et al. | |
| 2024/0097778 A1 | 3/2024 | Han et al. | |
| 2024/0162977 A1 | 5/2024 | Muthuraman et al. | |
| 2024/0162979 A1 | 5/2024 | Kies et al. | |
| 2024/0163708 A1 | 5/2024 | Kumar et al. | |
| 2024/0163833 A1 | 5/2024 | Han et al. | |
| 2024/0205874 A1* | 6/2024 | Xiong | H04W 36/00 |
| 2024/0422523 A1 | 12/2024 | Grilli et al. | |

FOREIGN PATENT DOCUMENTS

| | | |
|---|---|---|
| CN | 101938287 | 1/2011 |
| CN | 109639337 | 4/2019 |
| CN | 112737661 A | 4/2021 |
| CN | 113055072 A | 6/2021 |
| CN | 113300757 A | 8/2021 |
| CN | 113328784 A | 8/2021 |
| EP | 0963061 A2 | 12/1999 |
| EP | 4002719 A1 | 5/2022 |
| EP | 4221383 A1 | 8/2023 |
| WO | 2018112502 A1 | 6/2018 |
| WO | 2020051508 A1 | 3/2020 |
| WO | 2020132201 A1 | 6/2020 |
| WO | 2022117339 A1 | 6/2022 |

(56) References Cited

FOREIGN PATENT DOCUMENTS

| WO | 2022147664 A1 | 7/2022 |
|---|---|---|
| WO | 2022157735 A1 | 7/2022 |
| WO | 2022232963 A1 | 11/2022 |

OTHER PUBLICATIONS

Lines T., et al., "3D Map Creation Using Crowdsourced GNSS Data", Computers, Environment and Urban Systems, New York, NY, US, vol. 89, Jun. 19, 2021, pp. 1-14, XP086732227, From p. 1, "Abstract" to end of section 4 "GNSS-mapping algorithm", p. 12, figures 1,2,3.

Takahashi M., "An Effective Satellite Handover System in Future-Oriented Vehicular Communication Society on Collaborative GPS Archive with Distributed Sensors", 2006 10th IEEE Singapore International Conference on Communication Systems (ICCS), IEEE, PI, Oct. 1, 2006, 5 Pages. XP031042156, From "Abstract" to end of section 2.3 "Output of the Receiver", p. 1-p. 2, figure 1, From section 3 "Frameworks and results" from end of section 3.3 "Visibility duration histogram", p. 3-p. 4, figures 5,6, Section 5 "Conclusion", p. 5.

APPLE: "On GNSS Measurement for NTN", 3GPP TSG-RAN4 Meeting #98bis-e, R4-2104834, 3rd Generation Partnership Project, Mobile Competence Centre, 650, Route Des Lucioles, F-06921 Sophia-Antipolis Cedex, France, vol. RAN WG4, No. Online, Apr. 12, 2021-Apr. 20, 2021 Apr. 2, 2021, 3 Pages, XP052175845, Sections 1 and 2.

CMCC: "Discussion on Improved GNSS Operations for IoT NTN", 3GPP TSG RAN WG1 #109-e, R1-2204330, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 5 Pages, XP052153493, Section 2.

D4 THALES: "Satellite and Terrestrial Network for 5G (761413), D4.4 Harmonisation of SATCOM with 5G Control and User planes Contractual Delivery Date M27 (Final)", Dec. 1, 2019, pp. 1-201, XP055743394, Section 5.

Inter Digital Inc: "GNSS Acquisition and Reporting for IoT NTN", 3GPP RAN WG1 Meeting #110bis-e, R1-2209645, 3rd Generation Partnership Project, Mobile Competence Centre, 650, Route Des Lucioles, F-06921 Sophia-Antipolis Cedex, France, vol. RAN WG1, No. eMeeting, Oct. 10, 2022-Oct. 19, 2022, Sep. 30, 2022, 4 Pages, XP052259118, R1-2209645, Section 2.

X Sai., et al., "Envisioning Intelligent Reflecting Surface Empowered Space-air-ground Integrated Network", IEEE Network, IEEE Service Center, New York, NY, US, vol. 35, No. 6, Dec. 21, 2021, pp. 225-232, XP011898408, Abstract, section, Advanted Beamforming Design.

LG Electronics Inc: "Contents of Ephemeris Including Beam Type Information", 3GPP TSG-RAN WG2 Meeting #113bis-e, R2-2103307, 3rd Generation Partnership Project (3GPP), Mobile Competence Centre, 650, Route Des Lucioles, F-06921 Sophia-Antipolis Cedex, France, vol. RAN WG2, No. Online, Apr. 12, 2021-Apr. 20, 2021, Apr. 2, 2021, 5 Pages, XP052174891, section 2, in special sections 2.4, 2.5.

THALES: "Idle Mode Procedures in NR NTN", 3GPP TSG-RAN WG2 Meeting #112-e, R2-2009255, 3rd Generation Partnership Project (3GPP), Mobile Competence Centre, 650, Route Des Lucioles, F-06921 Sophia-Antipolis Cedex, France, vol. RAN WG2, No. Online, Nov. 2, 2020-Nov. 13, 2021, Oct. 21, 2020, 6 Pages, XP052362309, Section 3.2.

* cited by examiner

Step 1: Estimation process flow

The snapshot of TLE data at timepoint $t_{ref}$

| Plane No | Slot No | TLE Data at reference time $t_{ref}$ |
|---|---|---|
| 1 | 1 | 0 IRIDIUM 145<br>1 43253U 18030E  22081.44771645  .00000166  00000+0  52340-4  0  9990<br>2 43253  86.4010 217.1859 0001088 104.7720 255.3597 14.34217629208284 |
| ... | ... | |
| 1 | 11 | 0 IRIDIUM 157<br>1 43251U 18030C  22081.44138242  .00000166  00000+0  52372-4  0  9993<br>2 43251  86.4010 217.1967 0002339 101.2534 258.8925 14.34217266208298 |
| ... | ... | |
| 6 | 11 | 0 IRIDIUM 111<br>1 41926U 17003K  22081.51558397  .00000190  00000+0  60878-4  0  9991<br>2 41926  86.4026  15.1119 0002450  82.0309 278.1164 14.34215037271426 |

FIG. 7A

0 IRIDIUM 145
1 43253U 18030E  22081.44771645  .00000166  00000+0  52340-4  0  9990
2 43253  86.4010 217.1859 0001088 104.7720 255.3597 14.34217629208284

FIG. 7B

| Plane No | Slot No | Reference epoch time (UTC) | square-root of semimajor axis [sqrt-m] | Eccentricity [no units] | Mean anomaly [rad] | Inclination angle [rad] | RAAN [rad] | RAAN rate [rad/s] | Argument of perigee [rad] |
|---|---|---|---|---|---|---|---|---|---|
| 1 | 1 | 12/30/2020 17:10:18 | 2675.597362 | 0.00127204 | -1.9291205 | 1.5078989 | -0.9066168 | -8.44120E-08 | 1.5160931 |
| 1 | 2 | 12/30/2020 17:10:18 | 2675.597362 | 0.00126700 | -2.5421858 | 1.5079065 | -0.9056377 | -8.44019E-08 | 1.5572974 |
| 1 | 3 | 12/30/2020 17:10:18 | 2675.597362 | 0.00132249 | -3.1284206 | 1.5079014 | -0.9062595 | -8.44098E-08 | 1.5728633 |
| 1 | 4 | 12/30/2020 17:10:18 | 2675.597362 | 0.00123851 | 2.5718553 | 1.5079011 | -0.9060693 | -8.44091E-08 | 1.5840094 |
| 1 | 5 | 12/30/2020 17:10:18 | 2675.597362 | 0.00127058 | 1.9992627 | 1.5079004 | -0.9058177 | -8.44108E-08 | 1.5855347 |
| 1 | 6 | 12/30/2020 17:10:18 | 2675.597362 | 0.00125733 | 1.3717254 | 1.5079031 | -0.9062302 | -8.44068E-08 | 1.6424170 |
| 1 | 7 | 12/30/2020 17:10:18 | 2675.597362 | 0.00128024 | 0.8626089 | 1.5078975 | -0.9064619 | -8.44132E-08 | 1.5799323 |
| 1 | 8 | 12/30/2020 17:10:18 | 2675.597362 | 0.00127853 | 0.3016443 | 1.5078963 | -0.9066648 | -8.44146E-08 | 1.5699421 |
| 1 | 9 | 12/30/2020 17:10:18 | 2675.597362 | 0.00125499 | -0.2681715 | 1.5078989 | -0.9063219 | -8.44116E-08 | 1.5688381 |
| 1 | 10 | 12/30/2020 17:10:18 | 2675.597362 | 0.00125588 | -0.8550400 | 1.5078957 | -0.9067195 | -8.44156E-08 | 1.5841629 |
| 1 | 11 | 12/30/2020 17:10:18 | 2675.597362 | 0.00123449 | -1.4441749 | 1.5079006 | -0.9065076 | -8.44099E-08 | 1.6012460 |
| 2 | 1 | 12/30/2020 17:10:18 | 2675.597362 | 0.00127342 | -2.3092026 | 1.5078740 | -0.3548720 | -8.44291E-08 | 1.5874090 |
| 2 | 2 | 12/30/2020 17:10:18 | 2675.597362 | 0.00123558 | -2.8937053 | 1.5078669 | -0.3549334 | -8.44372E-08 | 1.6008851 |
| 2 | 3 | 12/30/2020 17:10:18 | 2675.597362 | 0.00123372 | 2.8308555 | 1.5078767 | -0.3538868 | -8.44248E-08 | 1.5882591 |
| 2 | 4 | 12/30/2020 17:10:18 | 2675.597362 | 0.00123028 | 2.2627894 | 1.5078684 | -0.3547299 | -8.44372E-08 | 1.5852053 |
| 2 | 5 | 12/30/2020 17:10:18 | 2675.597362 | 0.00125233 | 1.7084962 | 1.5078695 | -0.3548944 | -8.44354E-08 | 1.5681504 |
| 2 | 6 | 12/30/2020 17:10:18 | 2675.597362 | 0.00122449 | 1.1215493 | 1.5078707 | -0.3545251 | -8.44334E-08 | 1.5844645 |
| 2 | 7 | 12/30/2020 17:10:18 | 2675.597362 | 0.00126933 | 0.5247787 | 1.5078592 | -0.3536266 | -8.44479E-08 | 1.6095974 |
| 2 | 8 | 12/30/2020 17:10:18 | 2675.597362 | 0.00126550 | -0.0454045 | 1.5078789 | -0.3543413 | -8.44216E-08 | 1.6084517 |
| 2 | 9 | 12/30/2020 17:10:18 | 2675.597362 | 0.00125315 | -0.6102679 | 1.5078513 | -0.3570717 | -8.44596E-08 | 1.6021373 |
| 2 | 10 | 12/30/2020 17:10:18 | 2675.597362 | 0.00124555 | -1.1753271 | 1.5078827 | -0.3533421 | -8.44175E-08 | 1.5965761 |
| 2 | 11 | 12/30/2020 17:10:18 | 2675.597362 | 0.00125611 | -1.7528102 | 1.5078785 | -0.3540126 | -8.44226E-08 | 1.6028179 |

Orbital Plane 1: rows with Plane No 1
Orbital Plane 2: rows with Plane No 2

FIG. 8

SATELLITE POSITIONING FOR SATELLITE-BASED COMMUNICATIONS

BACKGROUND

1. Field of Disclosure

The present disclosure relates generally to the field of wireless communications, and more specifically to enabling a mobile device (e.g., a cellular phone) to communicate using satellite-based communications.

2. Description of Related Art

Satellite-based communications in the past have been limited to satellite phones having specialized antennas to enable the satellite phone to effectively send and receive signals to and from satellites. As the number of communication satellites increases, so does the possibility of enabling satellite-based communication for other types of devices. However, for non-specialized devices, such as standard mobile phones, such communications may be an impracticality if users are unable to orient mobile phones such that communication satellites fall within the main lobe of the mobile phone antenna. Further, because communication satellites may perform movements within their orbit (e.g., station keeping, to help avoid collisions) determining a location of a communication satellite in real time can be challenging without updating orbital parameters frequently (e.g., once every few weeks).

BRIEF SUMMARY

An example method of facilitating pointing of a mobile device at a satellite of a satellite constellation for satellite-based data communication, according to this disclosure, may comprise obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points. The method may also comprise assigning a reference orbital dataset of the plurality orbital datasets determined at a reference time point to corresponding control boxes of a reference grid covering the satellite constellation, wherein each control box of the reference grid corresponds to a satellite of the satellite constellation. The method may also comprise mapping the plurality orbital datasets to the reference grid for an orbital model based on the assignment of the reference orbital dataset.

An example apparatus for facilitating pointing of a mobile device at a satellite of a satellite constellation for satellite-based data communication, the apparatus comprising means for obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points. The apparatus also comprises means for assigning a reference orbital dataset of the plurality orbital datasets determined at a reference time point to corresponding control boxes of a reference grid covering the satellite constellation, wherein each control box of the reference grid corresponds to a satellite of the satellite constellation. The apparatus also comprises means for mapping the plurality orbital datasets to the reference grid for an orbital model based on the assignment of the reference orbital dataset.

An example device for facilitating pointing of a mobile device at a satellite of a satellite constellation for satellite-based data communication, according to this disclosure, may comprise a transceiver, a memory, one or more processors communicatively coupled with the transceiver and the memory, wherein the one or more processors are configured to obtain, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points. The one or more processors may also be configured to assign a reference orbital dataset of the plurality orbital datasets determined at a reference time point to corresponding control boxes of a reference grid covering the satellite constellation, wherein each control box of the reference grid corresponds to a satellite of the satellite constellation. The one or more processors may also be configured to map the plurality orbital datasets to the reference grid for an orbital model based on the assignment of the reference orbital dataset.

According to this disclosure, an example non-transitory computer-readable medium stores instructions for facilitating pointing of a mobile device at a satellite of a satellite constellation for satellite-based data communication, the instructions comprising code for obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points. The instructions further may comprise code for assigning a reference orbital dataset of the plurality orbital datasets determined at a reference time point to corresponding control boxes of a reference grid covering the satellite constellation, wherein each control box of the reference grid corresponds to a satellite of the satellite constellation. T The instructions further may comprise code for mapping the plurality orbital datasets to the reference grid for an orbital model based on the assignment of the reference orbital dataset.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 7A and 7B are tables illustrating an example snapshot of two-line element set (TLE) data of the constellation used for performing step 1 of the process flow described herein with regard to FIG. 6.

FIG. 8 is a table illustrating example Keplerian orbital parameter values generated by performing step 2 of the process flow described herein with regard to FIG. 6.

Figure 1:
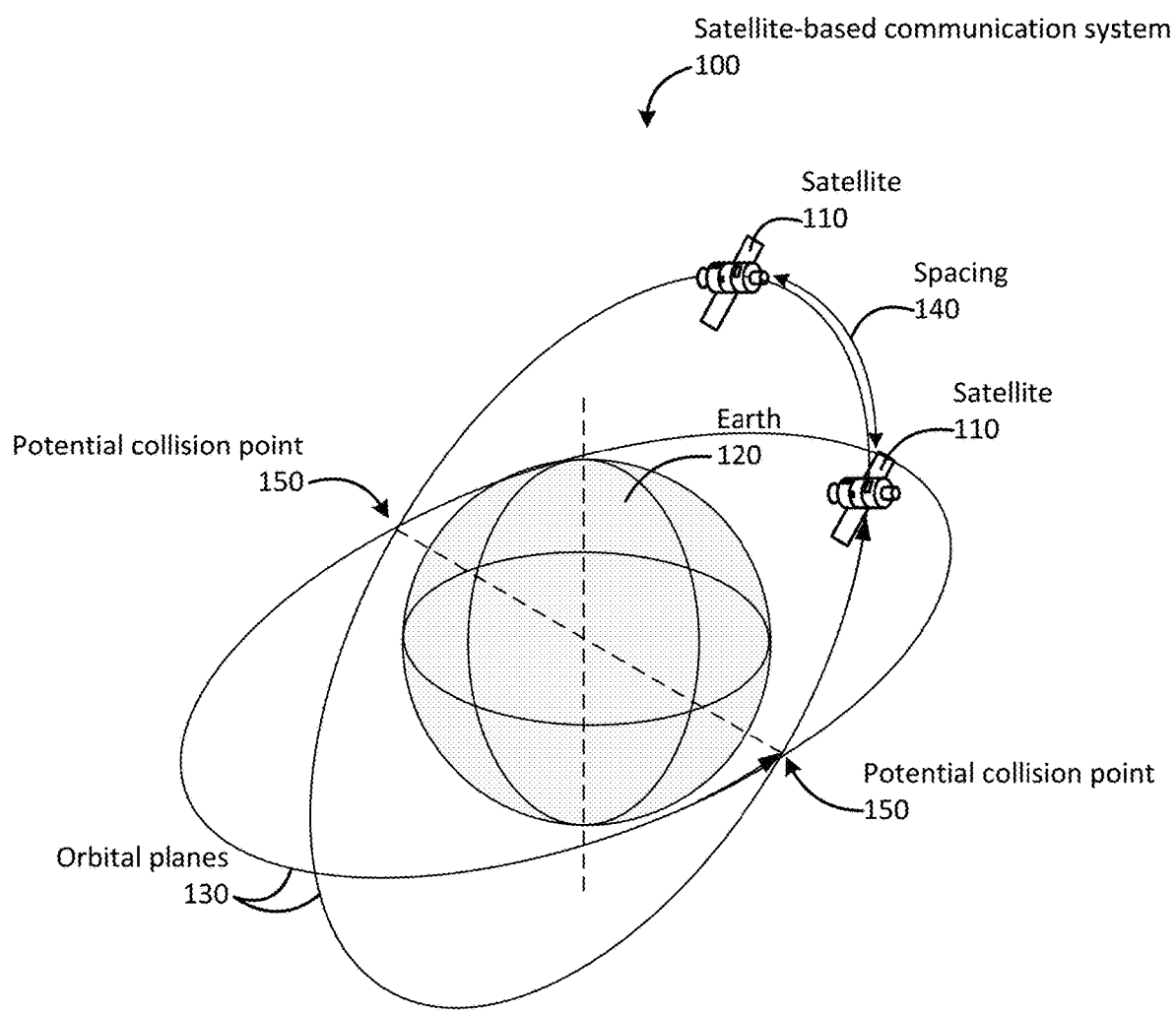
FIG. 1 is a diagram of a satellite-based communication system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative examples will now be described with respect to the accompanying drawings, which form a part hereof. While particular examples, in which one or more aspects of the disclosure may be implemented, are described below, other examples may be used and various modifications may be made without departing from the scope of the disclosure of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "mobile device" may comprise a mobile electronic device that may be capable of wireless communications. Although often illustrated as a mobile phone (or "user equipment" (UE) of a cellular network), the wireless communication capabilities of the mobile device are not intended to be specific or otherwise limited to any particular Radio Access Technology (RAT), unless otherwise noted. In general, a mobile device may be any wireless communication device that may be oriented by a user (e.g., a mobile phone, router, tablet computer, laptop computer, tracking device, wearable (e.g., smartwatch, glasses, Augmented Reality (AR)/Virtual Reality (VR) headset, etc.), Internet of Things (IoT) device, etc.), or other electronic device that may be used for Global Navigation Satellite Systems (GNSS) positioning as described herein. According to some embodiments, a mobile device may be used to communicate over a wireless communications network. A mobile device may be mobile or may (e.g., at certain times) be stationary, and may communicate with a terrestrial Radio Access Network (RAN), when in range of the RAN. As used herein, the term mobile device may be referred to interchangeably as a UE, an Access Terminal (AT), a client device, a wireless device, a subscriber device, a subscriber terminal, a subscriber station, a user terminal (UT), a mobile device, a mobile terminal, a mobile station, or variations thereof. Generally, mobile devices can communicate with a core network via a RAN, and through the core network, the mobile devices can be connected with external networks (such as the Internet) and with other mobile devices. Other mechanisms of connecting to the core network and/or the Internet are also possible for the mobile devices, such as over wired access networks, wireless local area network (WLAN) networks (e.g., based on the Institute of Electrical and Electronics Engineers (IEEE) 802.11 standard, etc.), and so on.

As described herein, a GNSS receiver may comprise and/or be incorporated into an electronic device. This may include a single entity or may include multiple entities such as in a personal area network where a user may employ audio, video and/or data I/O devices and/or body sensors and a separate wireline or wireless modem. As described herein, an estimate of a location of the Global Positioning System (GPS) receiver may be referred to as a location, location estimate, location fix, fix, position, position estimate or position fix, and may be geodetic, thus providing location coordinates for the GPS receiver (e.g., latitude and longitude) which may or may not include an altitude component (e.g., height above sea level, height above or depth below ground level, floor level or basement level). In some embodiments, a location of the GPS receiver and/or an electronic device comprising the GPS receiver may also be expressed as an area or volume (defined either geodetically or in civic form) within which the GPS receiver is expected to be located with some probability or confidence level (e.g., 67%, 95%, etc.). In the description contained herein, the use of the term location may comprise any of these variants unless indicated otherwise. When computing the location of a GPS receiver, such computations may solve for local X, Y, and possibly Z coordinates and then, if needed, convert the coordinates from one coordinate frame to another.

Satellite-based communication systems have been increasing in recent years, expanding the coverage of voice-based and date-based communication. This can enable telephone coverage and Internet access to regions not previously covered by terrestrial wireless (e.g., cellular/mobile communication networks) or wired networks (e.g., traditional wired telephone networks, cable, digital subscriber line (DSL), etc.).

FIG. 1 is a diagram of a satellite-based communication system 100 in which satellites 110 orbit the earth 120, traveling along a path in orbital plane 130. For simplicity, the diagram has been greatly simplified. In practical embodiments, satellite-based communication systems 100 may comprise dozens of satellites 110 with many orbital planes 130. The Iridium® communication system, for example, has 66 satellites: 11 satellites in each of six orbital planes. To help optimize communication efficiency, satellites 110 in such satellite-based communication systems 100 are typically equally spaced such that the spacing 140 is approximately the same between all satellites 110 in an orbital plane 130.

At times, satellites 110 may depart from a regular orbit due to controlled maneuvers. For example, at times, satellites 110 may be steered to avoid collisions with other satellites 110 (and/or other objects in space). This can occur, for example, when satellites 100 can from different orbital planes 130 approach potential collision points 150 (where orbital planes 130 intersect) at approximately the same time. (This assumes that satellites 110 in intersecting orbital planes 130 are orbiting the earth 120 at approximately the same altitude, which is common for satellite-based communication systems). Because of this, orbital models that predict location of communication satellites 110 are often unable to accurately predict the location of satellites 110 for a long period of time. For a given satellite 110, steering events may occur every few weeks (Iridium satellites are corrected every 4-7 weeks, approximately). And thus, such orbital models are typically unable to accurately predict the location of the satellite 110 for longer than a few weeks.

Figure 2:
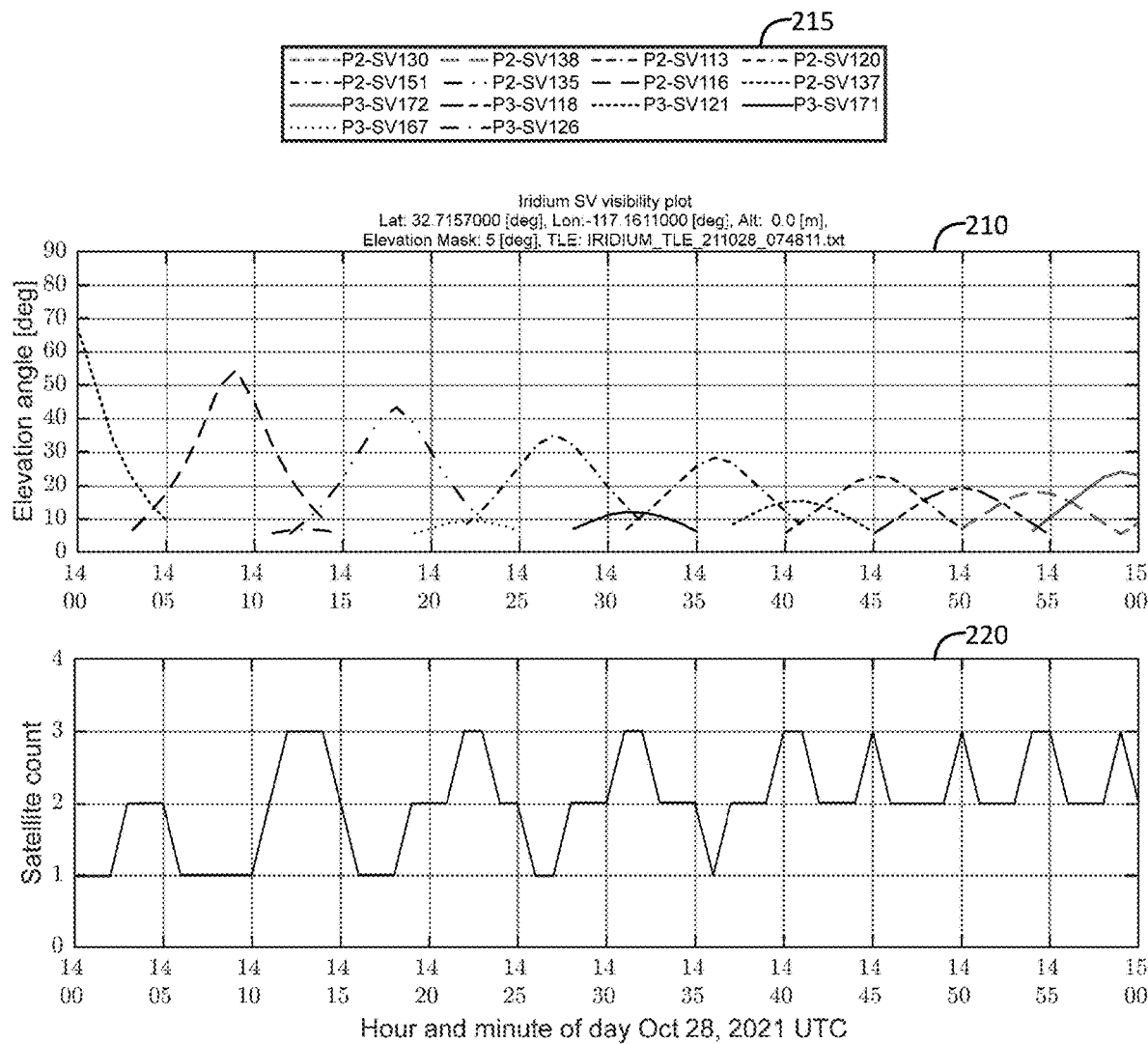
FIG. 2 is a set of graphs showing example visibility and number of satellites that move across the sky over the course of an hour for a constellation of communication satellites.

Satellite-based communication systems, such as the one illustrated in FIG. 1 generally operate satellites within low earth orbit (LEO), in which the altitude of the satellites is 2,000 km or less. That said, some satellite-based communication systems may operate in medium earth orbit (MEO) (with an altitude of approximately 10,000 to 20,000 callers) or geostationary earth orbit (GEO) (with an altitude of approximately 35,786 km). For LEO satellites, this means satellites move much more quickly across the sky, relative to a user on the earth's surface. FIG. 2 helps illustrate this concept.

FIG. 2 is a set of graphs showing example visibility and number of satellites that move across the sky over the course of an hour. This particular example is with respect to the visibility of Iridium NEXT satellites, from a perspective on earth a latitude of 32.71570000 and a longitude of −117.1611000° at sea level. The top chart 210 illustrates the change in elevation of different visible satellites (legend 215 specifies the particular satellites), and the bottom chart 220 indicates the number of satellites visible at any given time. Both charts illustrate how each satellite may be visible for only about 10 minutes. However, the orbits of the satellites (including the spacing between satellites and spacing between orbital planes) are such that at least one satellite is always visible at any given moment. And although different locations may have a different number of visible satellites (e.g., locations near the poles tend to have more visible satellites than locations near the equator), satellite communication systems may be designed to ensure at least one satellite is visible (assuming an open sky scenario) at any time and at any location on earth.

As noted, traditional satellite-based communications for mobile devices often required specialized mobile devices, such as satellite phones, which are typically expensive. However, mobile phone manufacturers and providers have been looking into opportunities for providing satellite communications (if only limited) to more traditional mobile devices, such as traditional cell phones. However, given the limitations of the battery capacity, antennas of traditional cell phones, along with the movement of communications satellites (e.g., LEO satellites) this can be a challenge.

Figure 3:
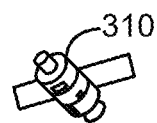
FIG. 3 is a diagram illustrating how satellite-based communications with mobile devices, such as traditional cell phones, can be enabled without specialized antennas for satellite communication.
Figure 3:
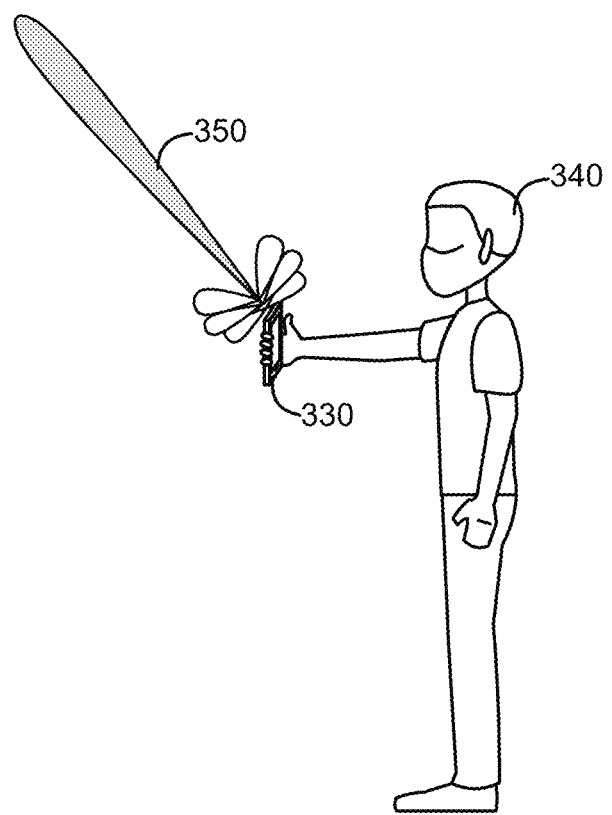

FIG. 3 is a diagram illustrating some of the challenges for enabling satellite-based communications with mobile devices, such as traditional cell phones, without specialized antennas for satellite communication. Here, a satellite 310 may service one or more terrestrial devices by directionally transmitting and receiving signals using one or more RF beams. To engage in satellite-based communications using a mobile device 330, a user 340 may need to orient the mobile device 330 such that the primary antenna node 350 of the mobile device antenna is substantially pointing at the satellite 310.

Once the primary antenna node 350 is pointed at the satellite 310, it may take only a few seconds for the mobile device 330 to establish a communication link with the satellite 310 and transmit/receive data. In some embodiments, such functionality may be provided (e.g., by a mobile carrier) to users or subscribers of a satellite-based communication service to enable users to transmit and/or receive data when not in coverage of a terrestrial wireless network (e.g., cellular network). Data may be sent in emergencies and may comprise an SOS or other emergency message, for example. Additionally or alternatively, text messages may be buffered and sent/received when a communication link is established between the mobile device 330 and satellite 310. Other data and/or voice services may be facilitated using such satellite-based communication.

Such communication, however, relies on the user 340 being able to successfully point the primary antenna node 350 of the mobile device 330 toward the satellite 310. And different factors may make this particularly challenging. Accuracy to which a mobile device 330 with a main node 350 needs to be pointed towards a satellite 310 is a function of error budget available. Error budget is typically a function of antenna main node 350 characteristics. Most of the available error budget is allocated to account for user pointing error, leaving tighter requirements for components described in FIG. 6. For example, the primary antenna node 350 may not be oriented with respect to the mobile device 330 in a manner that makes "pointing" the primary antenna node 350 toward the satellite 310 easy or intuitive. Further, the primary antenna node 350 may be relatively narrow such that 3-5° of error, for example, may impact performance. Additionally, as previously noted, the position and movement of the satellite 310 in the sky may be difficult to accurately predict if the satellite 310 undergoes steering events.

Embodiments herein help address at least some of these issues by providing for accurate modeling of the orbital position of satellites in a satellite-based communication. Specifically, the techniques disclosed herein help prepare the orbital data for a model created by a server in communication with the mobile device where the model would be capable of accurately predicting the locations of satellites in a satellite-based communication system for an extended period of time. The orbital data for the model may be prepared/processed based on available raw data (e.g., historical orbital data as will be disclosed below such as TLE). To help enable a user to correctly orient the mobile device for satellite-based communication, the server can provide assistance data including the model to the mobile device. The techniques provided herein may be used to prepare the model data (e.g., the input data of the model) from publicly available raw data, where the models are capable of accurately predicting the locations of satellites for over a year (e.g., within 41 km or 3° from the perspective of a user on earth with 99% ile confidence).

Figure 4:
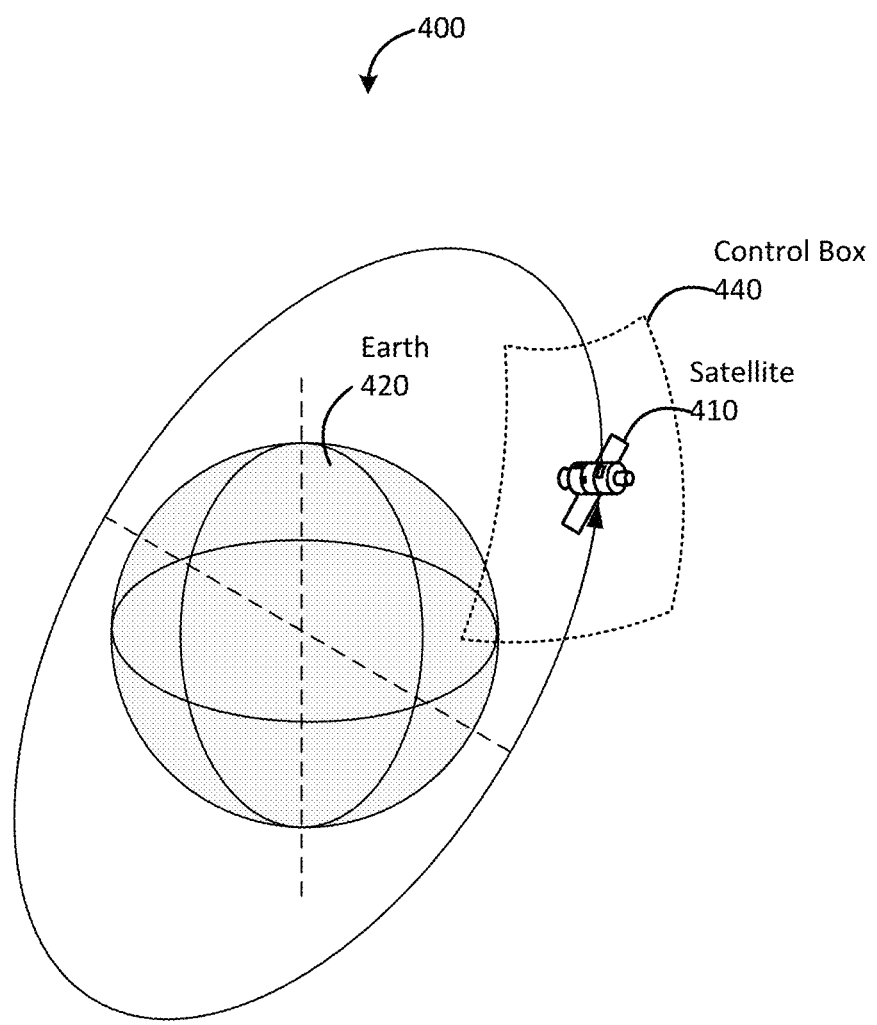
FIG. 4 is a diagram provided to illustrate conceptually what satellite modeling may do to predict the location of a given satellite, according to some embodiments.

FIG. 4 is a diagram 400, similar to FIG. 1, provided to illustrate conceptually what satellite modeling may do to predict the location of a given satellite 410, according to some embodiments. Using standard modeling techniques, traditional satellite modeling may predict a location of the satellite 410 with a certain degree of accuracy. However, these models are typically no longer applicable after a steering event because, when undergoing a steering event in which the satellite 410 temporarily departs from its position in the orbit, the satellite 410 typically does not return to its exact position in the orbit as modelled using standard techniques. Thus, traditional satellite modeling for a given satellite 410 may last only for a few weeks, or until a steering event takes place.

According to embodiments, more robust models can be made by modeling the location of a control box 440 of the satellite 410, rather than the exact location of the satellite 410 itself. A control box 440 of a satellite 410 is a region within which the satellite 410 is typically located. The combination of all control boxes for all satellites of a satellite constellation may be referred to as a reference grid, where each "cell" of the reference grid corresponds to a control box of a satellite. Satellite constellations are typically created and maintained with the idea that although each satellite may deviate from a normal orbit, it can be controlled to stay within a threshold distance from its predicted location. This is especially true with satellites of a satellite-based communication system (e.g., LEO communication satellites), where, as previously indicated, accurate spacing between satellites is desired. So although a steering event may cause a satellite 410 to temporarily leave its control box 440, the satellite 410 will typically returned to its control box 440. And thus, steering events generally do not impact the location of the control box 440.

Because satellites of a satellite-based communication system have a "tight" control box in (e.g., spanning 10-20 km in width and height), a mobile device may be able to engage in communication with a satellite when the primary antenna node of the mobile device (e.g., primary antenna lobe 350 of FIG. 3) is pointed at a center point of the control box 440, rather than at the actual location of the satellite 410. With this in mind, and because steering events generally do not impact the location of the control box 440, as previously noted, embodiments herein can model the location of the control box 440 (e.g., the center point of the control box 440), providing satellite modeling that enables a user to orient a user device for satellite communication, where (as previously noted) the model can remain accurate for over year, rather than just a few weeks. A detailed description of how this modeling can be performed is provided hereafter.

When modeling based on the location of control box 440, historical orbital data of each control box 440 may be used. However, determining the historical orbital data of each control box 440 of the reference grid based on existing raw data of the satellites (e.g., the TLE data of the satellites of the satellite constellation) may be challenging because the raw data of each satellite of the satellite constellation may not be a one-to-one mapping to control boxes 440 of the reference grid. For example, in Iridium NEXT constellation, there are additional 6 spare commercial satellites (also referred as "spare satellite" herein after) which may be put in action (e.g., becoming operational) and replace one of the operational commercial satellites (also referred as "operational satellite" herein after) when required for different reasons. Associating raw data of the satellites to control box 440 of the reference grid and estimating the orbital parameters of control box results in assistance data that is robust to satellite steering events and different satellites occupying the control box 440. This process of associating raw data to control box 440 will also automatically differentiate operational satellites and spare satellites in the satellite constellation dynamically at any given time within the learning period, where the raw data of a spare satellite will not be associated with the control box 440 of the reference grid.

Moreover, in existing models modeling the location of the exact location of the satellite (e.g., satellite 410) itself, prediction availability delays may happen when replacing an operational satellite with a spare satellite. For example, a prediction availability delay of about a few days to about a few weeks may be caused by finishing the learning process (e.g., accumulating enough orbital data) for a new operational satellite (e.g., a prior spare satellite that becomes operational by replacing a prior operational satellite). Because in at least some of the techniques disclosed herein, plurality of operational satellites occupying a control box 440 at different time periods may be considered to compute and provide predictions for the control box, there may be no such a delay when replacing an operational satellite with a spare satellite. Accordingly, the applicability of the estimation techniques disclosed herein can also be extended as well.

Figure 5:
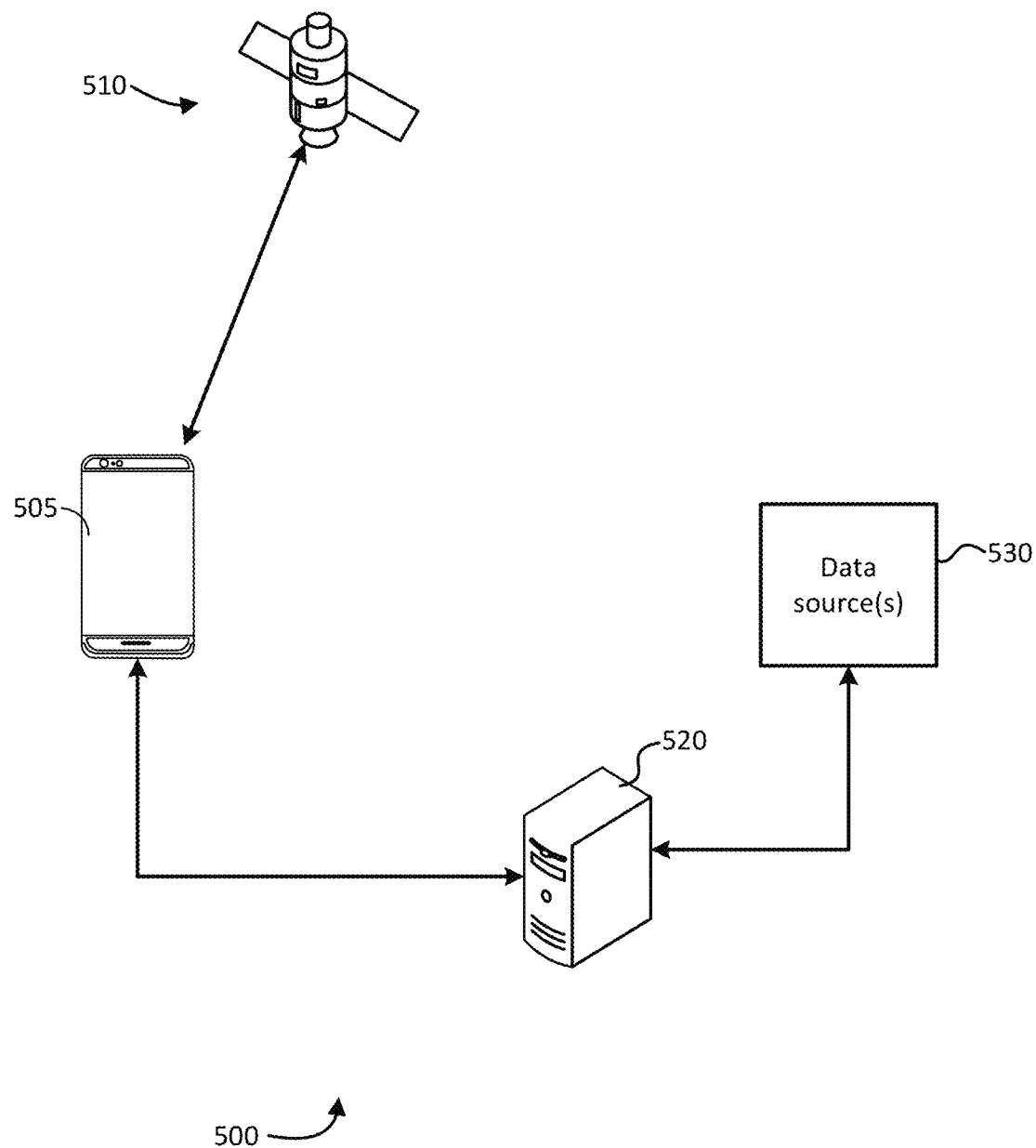
FIG. 5 illustrates an example architecture of a system for providing a mobile device with assistance data to enable a user to orient the mobile device for communicating with the satellite, according to an embodiment.

FIG. 5 illustrates an example architecture 500 of a system for providing a mobile device 505 with assistance data to enable a user to orient the mobile device 505 for satellite-based communications with the satellite 510, according to an embodiment. Arrows represent communication links, which may include one or more intervening devices, networks, etc. (not shown). As with other figures, FIG. 5 is provided as a nonlimiting example, and alternative embodiments may include additional or alternative components for providing assistance data to the mobile device 505.

In the example architecture 500, modeling can be done utilizing a server connected to one or more data sources 530. Here, the server 520 may comprise a computer server hosted in the cloud by a service for modeling satellite trajectory data. The service may be provided, for example, by a satellite-based communication carrier, mobile phone carrier, etc. communication between the server 520 and mobile device 505 may be relayed via one or more wired and/or wireless networks, including the Internet, a wireless cellular network, etc.

The data sources may comprise 530 computer servers and/or other devices providing orbital information regarding satellites (e.g., satellite 510) of a satellite-based communication system. As an example, United States Space Command (USSPACECOM) 18th Space Defense Squadron (18 SPDS) publishes Two Line Element (TLE) data (will be disclosed in detail along with the description of FIGS. 7A and 7B), which can be used with an unclassified Simplified General Perturbations #4 (SGP4) library to derive orbital information, based on radar observations. TLE data is typically published on the Internet several times per day.

Using historical data to accurately model control boxes for satellites in a constellation (e.g., using the techniques described hereafter), the server 520 can provide the model to the mobile device 505, enabling the mobile device 505 to determine a position of the satellite 510. With this information, along with an approximate location of the mobile device 505 on earth, the mobile device 505 can determine how it should be oriented in order to communicate with the satellite 510, and can prompt a user (e.g., using a graphical user interface, audio prompts, etc.) to orient the mobile device 505 in that way.

According to some embodiments, using historical data to determine an accurate long-term model for predicting the location of a control box and using the model to determine the relative location of visible satellites to a user can be done in a three-step process including for example, a preparation process step 1, an estimation process step 2, and an orientation process step 3, performed by a server and a mobile device collaboratively. For example, FIG. 6 is a flow diagram illustrating a process flow 600, illustrating a process for determining and using an accurate long-term model based on initial parameters to assist a user of the mobile device in orienting the mobile device to enable satellite-based communications, according to some embodiments.

As noted, the operations illustrated in this process flow 600 including step 1 (e.g., the preparation process), step 2 (e.g., the estimation process), and step 3 (e.g., the orientation process) may be performed by a server (e.g., a server 601) and a mobile device (e.g., a mobile device 602) collaboratively for UE orientation when engaging in satellite-based communication. For example, step 1, where historical data is used to prepare historical data for control boxes in the reference grid (e.g., mapping the historical orbital data to the reference grid), and step 2, where a model for satellite control box prediction for all satellites in the constellation may be determined (e.g., determining orbital parameter values of the model), may be performed on server 601. As previously noted, in step 3, the model including the determined orbital parameter values may then be received by UEs (e.g., mobile device 602) as assistance data, where the location of the control boxes for UE orientation when engaging in satellite-based communication may be determined accordingly. It is contemplated that although FIG. 6 shows that step 1 and step 2 are performed by a server (e.g., server 601) and step 3 is performed by a UE (e.g., mobile device 602), any suitable allocation of the processes (e.g., step 1, step 2, and step 3) may be possible. For example, all of the processes in process flow 600 may be performed by the UE itself (e.g., the UE may estimate the orbital models and store the models on the UE (e.g., perform step 1 and step 2), and perform step 3 when needed (e.g., when satellite communication is initiated)), or all of the processes in process flow 600 may be performed by the server itself (e.g., where the UE only provides its location to the server and the server provides the UE the list of satellites and their relative location over a period of time based on performing step 1, step 2, and step 3).

Figure 6:
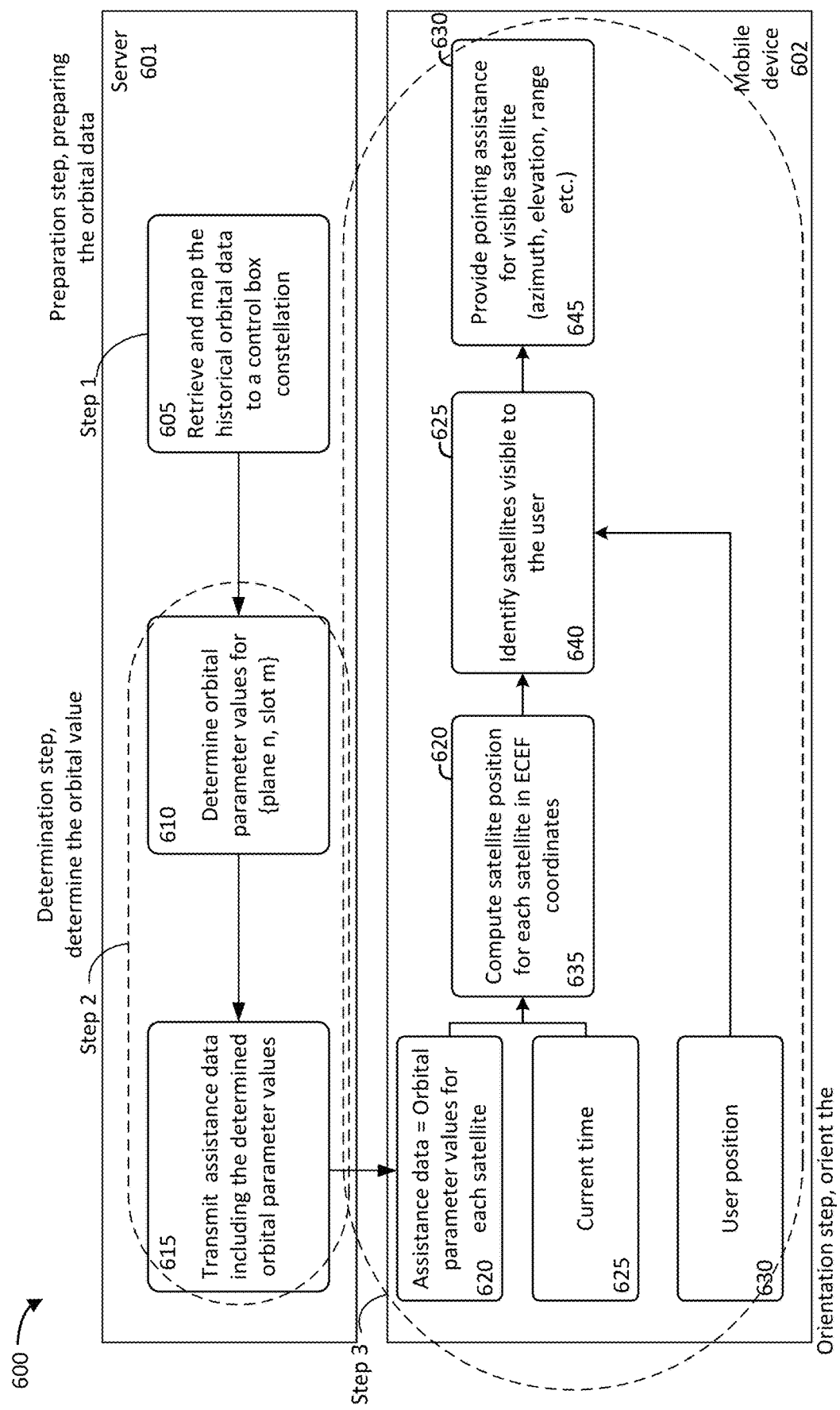
FIG. 6 is a flow diagram of a method for using historical orbital data to assist a user of the mobile device in orienting the mobile device to enable satellite-based communications, according to some embodiments.

It can be noted that the embodiments illustrated in FIG. 6 describe "control boxes" as indicating a virtual box in the nominal orbital path within which the satellite is ideally located. It is also noted that the allocation of functions performed in each block and/or step among different entities (e.g., server 601 and mobile device 602) as shown in FIG. 6 is for illustration only. Other allocation may also be possible for example, in some embodiments, step 1 (block 605) and block 610 of step 2 may also be performed by mobile device 602 without requiring a server 601 to compute and provide assistance, to name a few.

For example, as illustrated in FIG. 6, step 1 can begin with using the input provided at block 605. In particular, as previously noted, server 601 can retrieve the archive of orbital data (e.g., TLE (orbital) data) for satellites in a satellite-based communication constellation (also referred as "satellite constellation" herein after) over a period of time, as indicated at block 605. In some embodiments, the archive of TLE orbital data may include a plurality of snapshots of TLE orbital data (also referred as "TLE data" herein after) for satellites in a satellite-based communication constellation, determined at different time points (e.g., epoch times). Each of the TLE orbital data for the satellites may be mapped to the reference grid including the control boxes corresponding to each satellite of the satellite constellation. Details of the mapping process will be disclosed along with the description of FIG. 9.

For example, FIGS. 7A and 7B illustrate example TLE data for a satellite in the satellite constellation. As illustrated in FIG. 7A, at a given time point (e.g., a reference epoch time) $t_{ref}$, a snapshot of all 66 satellites in the satellite constellation may be determined. The snapshot may include a TLE dataset (e.g., TLE data 702) that includes orbital data corresponding to a satellite determined closer to $t_{ref}$. As illustrated in FIG. 7B, TLE data 702 may include a first portion 703 indicating the catalog number of the satellite and a second portion 705 indicating the time point $t_{ref}$ when TLE data 702 was determined. In some embodiments, at the end of step 1 and/or block 605, all archive TLE orbital data retrieved by server 601 may be mapped to the reference grid. For example, each TLE orbital data may be mapped/assigned for a plane number 704 and a slot number 706 (e.g., given a particular slot in a particular plane to each TLE orbital data) as shown in FIG. 7A respectively.

In some embodiments, satellite information may be provided in an earth centered inertial (ECI) reference frame. However, for determining a position of a satellite relative to a UE on the ground, it may be preferable to utilize an earth-centered, earth-fixed (ECEF) frame. Thus, embodiments may further obtain parameters for coordinate rotation from ECI to ECEF, before or during block 605.

In some embodiments, the amount of historical data used (e.g., the number of snapshots included in the archive orbital data), and the sampling interval used to compute the historical position of control boxes in step 1 may vary, depending on desired functionality. For example, TLE data covering a period of about 24 weeks used to compute position of control boxes at a fixed sampling rate of 5 minutes can help ensure the accuracy of the prediction by making the model to account for steering events (e.g., for Iridium NEXT satellites where each satellite undergoes a steering event every 4-7 weeks) for all satellites and therefore accurately predict satellite location for far longer than traditional models.

Referring back to FIG. 6, step 2 starts with block 610 where orbital parameter values for each control box may be determined based on the mapped reference grid determined from step 1. At block 615, the assistance data including the orbital parameter values and/or the determined model may be transmitted to a UE (e.g., mobile device 602). In some embodiments, block 610 may include preparing uniformly sampled, reference orbital data in ECEF spanning time period, computing a seed values for orbital parameters, and iteratively determining/estimating values for orbital parameters based on the seed values.

For example, preparation of the uniformly sampled orbital data in ECEF spanning time period T1 (e.g., 24 weeks as previously noted) may comprise determining a position (e.g., an x, y, z location) of each control box at a uniform sampling rate (e.g., every five minutes). Using the uniformly sampled reference orbital data, server 601 may then compute seed values for orbital parameters. Depending on the type of orbital model used for satellite position estimation, these orbital parameters may vary. For example, for a Keplerian model, the orbital parameters may comprise Keplerian orbital parameters such as square-root of semi-major axis, eccentricity, mean anomaly, inclination angle, Right Ascension of Ascending Node (RAAN), RAAN rate, and argument of perigee, or a combination thereof. Alternatively, equinoctial orbital modeling may be used, in which case the orbital parameters may comprise some or all of the equinoctial element set: semi-major axis, components of eccentricity vector in equinoctial reference frame, components of an ascending node vector in equinoctial reference frame, and mean longitude. In some embodiments, secondary or derived parameters may be used as the orbital parameters. For example, in classical Keplerian orbital modeling, the Keplerian element set can be represented using derived parameters such as orbital time period rather than semi-major axis because there is a direct relation between the two. In some embodiments, the seed values may be used to seed the iterative process of estimation of values for orbital parameters performed by the group of operations. The seed value may be obtained in any of a variety of ways, depending on desired functionality. In some embodiments, for instance, the seed values can be obtained from the final N epochs of reference orbital data extracted in block 605.

In some embodiments, the group of operations may include iteratively alter parameter values (e.g., starting with the seed values) to find a set of orbital parameter values that best fits the actual orbital data for period T1. This may be done by estimating, for each orbital parameter, a respective adjustment to the respective seed value to determine a respective candidate orbital parameter value. These candidate orbital parameter values may then be used to calculate a candidate orbital path. In some embodiments, the candidate orbital path may then be compared with the actual (reference) orbital path, and residuals indicating a difference between the candidate and actual orbital paths are computed. A cost function may be checked for convergence (e.g., whether values of residuals for successive iterations have changed beyond a threshold value). If there has not been convergence, then the process of estimating orbital parameter values can be repeated with updated orbital parameter values, estimated. However, once the iteration process results in a convergence (e.g., values of residuals from one iteration to the next do not change beyond a threshold) then the candidate orbital parameter values in the most recent iteration can be used as the output orbital parameter values of block 610. The process in block 605 and block 610 can be conducted, in parallel or in sequence, for all satellites/control boxes in the constellation (e.g., all planes and slots), or a subset thereof. It is noted that, the orbital parameter values for all control boxes or satellites of a satellite constellation may be determined together at block 610 similar to what is disclosed herein and will not be repeated for ease of illustration.

FIG. 8 is a table illustrating example Keplerian orbital parameter values generated by performing block 610 of step 2 of the estimation process flow described previously with regard to FIG. 6 using archived public TLE data for Iridium satellites. To avoid clutter, data from control boxes/satellites for only two orbital planes (22 satellites) and for a time period (T2) (e.g., T2 may span about 24 weeks) of historical data is shown. However, in practice, data from control boxes/satellites of all six planes may be used. It is contemplated that the time period disclosed herein (e.g., 24 weeks) are for illustrative purposes only, and any other suitable time period spans may be used. It is also contemplated that the orbital model used, and the orbital parameter values output of step 2 or block 610 may not be limited to the embodiment disclosed herein. For example, according to embodiments disclosed, the orbital model comprises a Keplerian model and the set of orbital parameter values comprises square-root of semi-major axis, eccentricity, mean anomaly, inclination angle, RAAN, RAAN rate, or argument of perigee, or a combination thereof as illustrated in FIG. 8. According to some other embodiments, the orbital model may comprise an equinoctial model and the set of orbital parameter values may comprise semi-major axis, components of an eccentricity vector in an equinoctial reference frame, components of an ascending node vector in the equinoctial reference frame, or mean longitude, or a combination thereof.

As can be seen, the output comprises a reference epoch time (e.g., timestamp to which the orbital parameters apply), along with values for the Keplerian orbital parameters: square-root of semi-major axis, eccentricity, mean anomaly, inclination angle, RAAN, RAAN rate, and argument of perigee. At this point in the model determination process (e.g., at the output of step one of the estimation process flow), each value of the seven Keplerian orbital is separately determined for each satellite. Thus, each control box/satellite may have a unique set of Keplerian orbital parameter values.

Referring back to FIG. 6, in block 615, assistance data may be transmitted to mobile device 602 for orienting mobile device 602 to enable satellite-based communications. In some embodiments, the assistance data may comprise the orbital parameter values determined by the server (e.g., as the output of step 2 of the estimation process of process flow 600) via a data communication network (e.g., via the internet, a cellular wireless network, and/or similar networks).

As previously noted, the mobile device may comprise a mobile electronic device such as a mobile phone. Other types of mobile devices can include a tablet, laptop, commercial or industrial mobile device, personal media player, headset or other wearable device, or the like. As illustrated in FIG. 6, step 3 may begin by mobile device 602 obtaining assistance data (as shown by block 620), a current time (block 625), and a current user position 630. As noted above, the assistance data may comprise the orbital parameter values determined by the server (e.g., as the output of step 2 of the estimation process of FIG. 6) via a data communication network (e.g., via the internet, a cellular wireless network, and/or similar network). The assistance data may have been previously obtained by the mobile device (e.g., when the mobile device was in coverage of a cellular or Wi-Fi network). However, as noted, using the techniques provided herein for determining orbital parameters for control boxes/satellites of a satellite-based communication system, the parameters may enable accurate prediction of control boxes/satellites for a year or more.

The current time obtained at block 625 can be used in the prediction of control boxes/satellites by the mobile device. As such, the current time may be substantially synchronized with the time used for determining the orbital parameter values, to enable an accurate prediction. According to some embodiments, the current time may be obtained by using a GNSS receiver of the mobile device to synchronize the mobile device to the accurate time of a GNSS constellation. In some embodiments, a current time of the mobile device, as maintained by the mobile device's clock, may be sufficiently accurate to enable an accurate prediction of satellite location.

The user position obtained at block 630 also may be obtained in different ways. Again, if the mobile device is equipped with a GNSS receiver, the mobile device can use GNSS positioning. Additionally or alternatively, the mobile device can used terrestrial-based positioning methods (including wireless network-based positioning, if available), dead reckoning (e.g., using sensors of the mobile device), or a combination thereof. To determine an alignment of the mobile device for satellite-based communications, the accuracy of the user position may not need to be highly granular but may be within a few kilometers of the mobile device's true location.

Using the assistance data and current time obtained at blocks 620 and 625, respectively, the mobile device can then compute the satellite position for each satellite in the constellation of the satellite-based communication system, as indicated at block 635. The orbital parameters can be used, for example, in standard (e.g., Keplerian, equinoctial, etc.) orbital models to determine (or predict) satellite position for the current time.

The functionality at block 640 comprises identifying one or more satellites visible to the user (or mobile device 602). Using the current satellite positions and the current user position, the mobile device can determine the relative position of each satellite to the user, and further determine the satellites above the horizon and visible (e.g., available for direct line-of-sight communications) to the mobile device. This determination may result in data similar to the data shown in FIG. 2, for example.

With the knowledge of which satellites are visible to the user, and the relative position of the satellites, the mobile device can then provide pointing assistance to the user to orient the mobile device in a way to enable the mobile device to engage in satellite-based communications with a satellite. As noted with regard to FIG. 3, this can be done further in view of the direction of the mobile device's main antenna lobe with respect to the mobile device. The pointing assistance can be provided using audio and/or visual prompts using a speaker and/or display of the mobile device. According to some embodiments, the mobile device may further notify the user when the mobile device is properly aligned, prompting the user to stop movement, and allowing the mobile device to engage in communications with the satellite with for it is oriented for communication.

According to some embodiments, the operations shown in one or more of the blocks in step 3 of FIG. 6 may be repeated during alignment of the mobile device to allow for real-time feedback to the user. For example, determination of satellite position at block 635, the identification of the visible satellites at block 640, and the providing of the pointing assistance at block 645 may be frequently refreshed (e.g., several times per second, once a second, once every few seconds, etc.) to allow the mobile device to guide the user to align the mobile device properly with a satellite, as the satellite moves across the sky. In some embodiments, the mobile device may prompt an alignment that "leads" the satellite, pointing to a position at which the satellite soon will be, to account for the time it may take a user to properly align the mobile device.

As noted above, one of the challenges to perform the process in FIG. 6 is to use historical data (e.g., the archive TLE orbital data) of satellites to accurately model control boxes for satellites (e.g., mapping the TLE orbital data to the reference grid). As will be disclosed in detail along with the description of FIG. 9, using the techniques disclosed herein to map the historical data to the reference grid may minimize the data propagation error (e.g., by sorting the archive data by the epoch time of the data) and may accurately and efficiently model the control boxes for the satellites.

Figure 9:
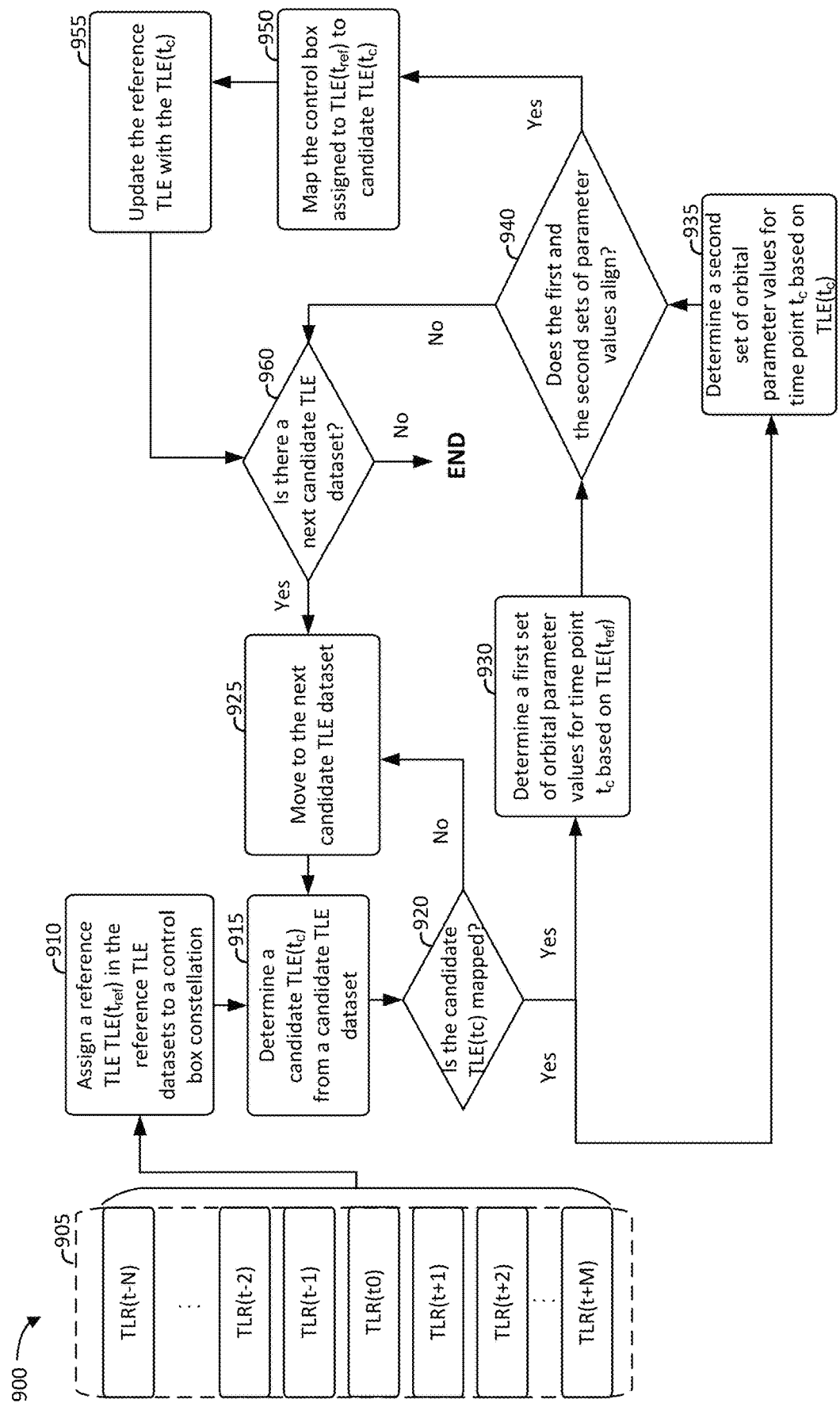
FIG. 9 is a flow diagram of a method for performing step 1 of the process flow described herein with regard to FIG. 6, according to some embodiments.

FIG. 9 is a flow diagram illustrating a process flow 900, illustrating a process 900 for determining an accurate mapping between the historical data the reference grid, according to some embodiments. In some embodiments, process 900 may correspond to block 605 in FIG. 6 and may be performed by a server (e.g., server 601 in FIG. 6). Starting at block 905, as noted above with regard to FIGS. 6, 7A, and 7B, the server may receive historical data (e.g., archived data) from a data source (e.g., data source 530 in FIG. 5). In some embodiments, the data source may be USSPACECOM $18^{th}$ SPDS as noted above, and the archived data may include a plurality of snapshots of TLE orbital data, determined during a time span of about 24 weeks, at an interval of less than a week. In some embodiments, for each satellite tracked by USSPACECOM $18^{th}$ SPDS, 2-3 TLE snapshots may be published every day. The technique disclosed herein may use all the raw data available during the learning period. It is noted that the TLE orbital data and the IRIDIUM NEXT satellite constellation are for illustration only. Other satellite constellation and orbital data may also be applied.

At block 910, the server may select one snapshot of the historical data as the reference orbital dataset for mapping. For example, as illustrated in FIG. 7A, the snapshot taken at $t_{ref}$ may be used as the reference dataset where each of the TLE data in the snapshot may be assigned to a control box of the reference grid (e.g., given a particular slot in a particular plane to each TLE orbital data of the reference dataset). For example, a first $TLE(t_{ref})$ may be assigned to a first control box of the reference grid. It is noted that the reference $TLE_{ref}$, a first candidate $TLE(t_c)$ taken at time point $t_c$, and a second candidate $TLE(t_{c-1})$ taken at time point $t_{c-1}$ disclosed herein and after may be any suitable TLE data in the corresponding dataset (e.g., any suitable TLE data from the snapshot). Alternatively, the reference TLE selected for each control box of the reference grid can have an epoch time ($t_{ref}$) anywhere within or near the period of interest (e.g., 24 weeks).

At block 915, the server may select a first candidate $TLE(t_c)$ of a first candidate dataset (e.g., the first candidate snapshot) determined at time point $t_c$. In some embodiments, the first candidate time point to may be a closest time point measured in time to the reference time point $t_{ref}$ among the different time points when the different datasets of the plurality of orbital datasets are determined (e.g., all the epoch times). For example, as illustrated in FIG. 9, when the reference time point $t_{ref}$ was selected as to, the first candidate $TLE(t_c)$ may be one of the TLE data determined at time point $t_{-1}$ or $t_{+1}$, depending on if the first candidate time point to is selected to be earlier in time or later in time than the reference time point $t_{ref}$.

At block 920, the server may determine if the first candidate TLE($t_c$) is already mapped to the reference grid (e.g., if the first candidate TLE($t_c$) is mapped to one of the control boxes of the reference grid). In some embodiments, if the first candidate TLE ($t_c$) is already mapped to the same control box as the TLE($t_{ref}$), the process may update to use TLE($t_c$) to replace the reference TLE($t_{ref}$). This step allows to reduce the impact of orbit propagation errors on the process. In some embodiments, if the first candidate TLE(t c) is already mapped to the reference grid, the process moves to block 925 where a next/second candidate TLE($t_{c-1}$) of a second candidate dataset (e.g., the second candidate snapshot) determined at time point $t_{c-1}$ may be selected where the first candidate time point to is earlier in time than the reference time point $t_{ref}$ (e.g., the mapping process goes backwards in time). Otherwise, if the first candidate time point to is later in time than the reference time point $t_{ref}$ (e.g., the mapping process goes forwards in time), a next/second candidate TLE($t_{c+1}$) of a second candidate dataset (e.g., the second candidate snapshot) determined at time point $t_{c+1}$ may be selected. After block 925, the second candidate TLE($t_{c-1}$) may replace the first candidate TLE($t_c$) (e.g., the first candidate TLE($t_c$) may be updated with the second candidate TLE($t_{c-1}$)) for finishing the rest portion of the process.

If the first candidate TLE($t_c$) is not yet mapped to the reference grid, the process moves to block 930 where a first set of orbital parameter values (e.g., right ascension of ascending node (RAAN) and/or argument of latitude) for the first candidate time point to may be determined based on the reference TLE($t_{ref}$). For example, the reference TLE$_{ref}$ may be propagated to the first candidate time point to $t_c$ calculate the orbital parameter values corresponding to the first candidate time point $t_c$. In block 935, the server may determine a second set of orbital parameter values (e.g., RAAN and/or argument of latitude) for the first candidate time point to based on the first candidate TLE($t_c$). For example, the orbital parameter values corresponding to the first candidate time point to may be determined using the first candidate TLE($t_c$). In some embodiments, block 930 and block 935 may be performed in parallel.

At block 940, the first and the second sets of orbital parameter values may be compared to see if the two sets of orbital parameter values align (e.g., if the difference between the two sets of orbital parameter values is below a predetermined threshold). For example, if the output of block 940 is "yes" (e.g., the first and the second sets of orbital parameter values align), the two comparing TLE data (e.g., the reference TLE($t_{ref}$) and the first candidate TLE($t_c$)) may correspond to a same control box. Accordingly, the process moves to block 950 where the first candidate TLE($t_c$) may be mapped to the first control box which the reference TLE($t_{ref}$) was assigned to in block 910. In this case, in block 955, the server may update the reference TLE($t_{ref}$) with the first candidate TLE($t_c$), and use the first candidate TLE($t_c$) as the new reference TLE (updating the reference time point $t_{ref}$ with the first candidate time point $t_c$ and updating the TLE($t_{ref}$) with the reference TLE($t_c$)) for further processing. After updating the reference data (e.g., the reference TLE ($t_{ref}$), the reference time point $t_{ref}$, and the reference dataset), the process moves to block 960 where if there is a next candidate TLE dataset (e.g., a snapshot taken at a next time point) exists in the historical data. If the determination is "no", meaning that the mapping process has traversed the historical data at least in one time direction (e.g., in forward or backward direction), the process ends (e.g., either completely ends the mapping process or goes back to the original reference data and mapping the historical data in an opposite time direction). If the determination is "yes", the process moves back to block 925 and repeat the process with the updated reference data.

Referring back to block 940, if the output of block 940 is "no" (e.g., the first and the second sets of orbital parameter values do not align), the process moves to block 960 where whether the process ends, or repeats will be determined.

Accordingly, when the process ends, all the historical data received by the server may be mapped to the corresponding control box of the reference grid. The historical data mapped to the reference grid may be input to block 610 of FIG. 6 for the estimation process (e.g., step 2 in FIG. 6). As noted above, it is contemplated that the control box positions computed using the historical data mapped to the reference grid may be rotated/transformed from ECI to ECEF after being mapped to the reference grid, or when received by the server (e.g., the orbital model of the historical data received by server already results in control box positions in ECEF coordinates).

By sorting the historical data by the epoch time of the data, where the orbital parameter values determined based on the candidate data that is the closest in time to the reference time point are compared with orbital parameter values propagated from the reference data to the candidate time point (e.g., determine orbital parameter values for $t_c$ using the reference TLE($t_{ref}$)), the mapping techniques disclosed herein may minimize the data propagation error when creating historical data for the control boxes using the historical data (e.g., mapping the historical data to the reference grid).

Figure 10:
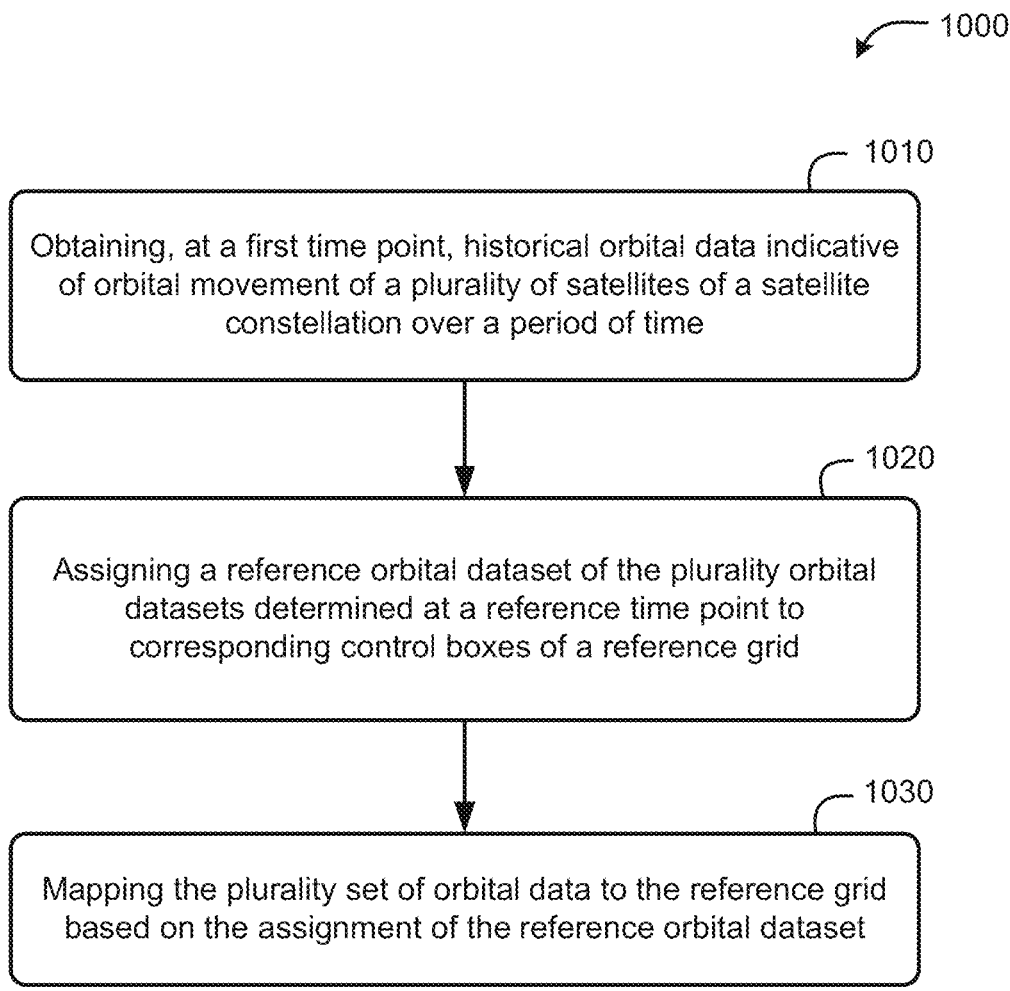
FIG. 10 is a flow diagram of a method of facilitating pointing of a mobile device at a satellite of a satellite constellation for satellite-based data communication, according to an embodiment.

FIG. 10 is a flow diagram of a method 1000 of a method of facilitating pointing of a mobile device at a satellite of a satellite constellation for satellite-based data communication. Means for performing the functionality illustrated in one or more of the blocks shown in FIG. 1000 may be performed by hardware and/or software components of a computer server as described herein. Example components of a computer server are illustrated in FIG. 12, which is described in more detail below. In some embodiments, some or all of the operations in FIG. 10 (and FIGS. 6 and/or 9) may be performed by a mobile device illustrated in FIG. 11 or by a computer server and a mobile device collaboratively.

At block 1010, the functionality comprises obtaining, at a first time point, historical orbital data indicative of orbital movement of a plurality of satellites of a satellite constellation over a period of time. As noted, each dataset of the plurality orbital datasets (e.g., a snapshot of the TLE data) comprises a plurality of orbital data (e.g., TLE data) corresponding to different satellites of the satellite constellation, and wherein the different datasets of the plurality orbital datasets are determined at different time points (e.g., different epoch times). In some aspects, this functionality may correspond to the operations at block 905 of FIG. 9, for example. As noted, the period of time may span for about 24 weeks at an interval for less than a week. In some embodiments, obtaining the historical orbital data comprises transforming the position of control boxes computed from archived TLE data from an earth centered inertial (ECI) reference frame to an earth-centered, earth-fixed (ECEF) frame. As described elsewhere herein, the satellite constellation may comprise a communication satellite constellation having satellites capable of communication with terrestrial devices.

Figure 11:
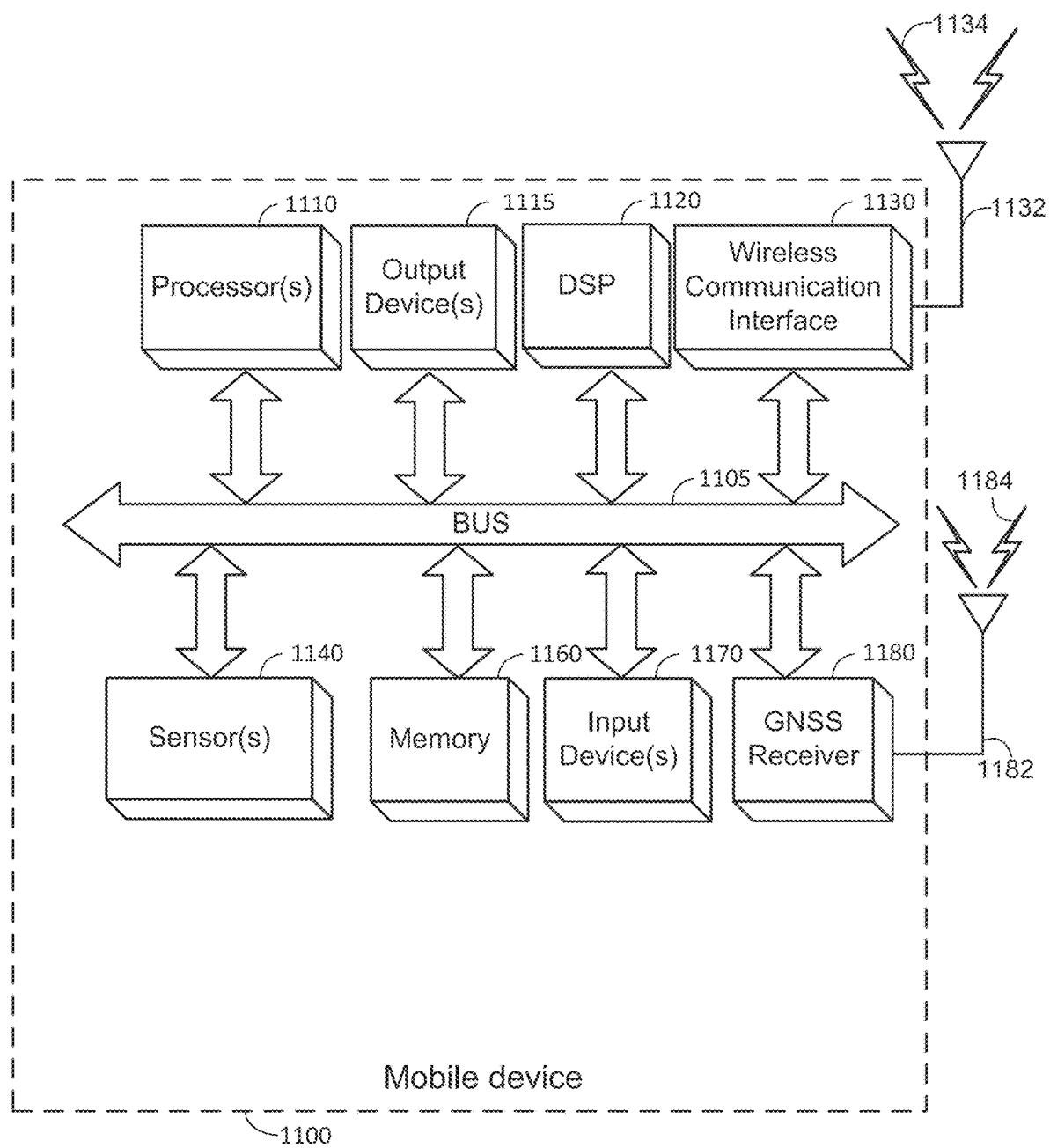
FIG. 11 is a block diagram of an embodiment of a mobile device, which can be utilized in embodiments as described herein.
Figure 12:
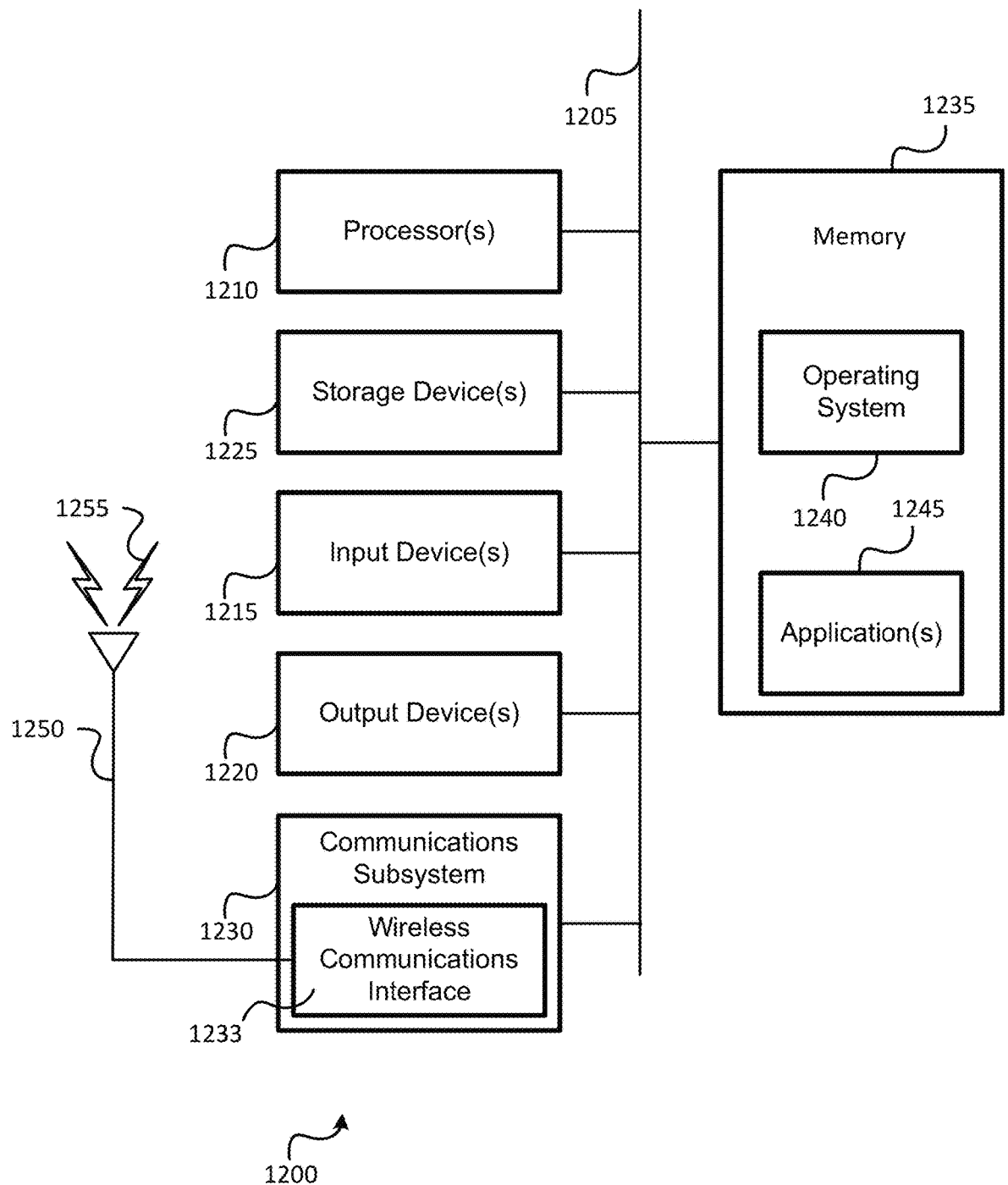
FIG. 12 is a block diagram of an embodiment of a computer system, which can be utilized in embodiments as described herein.

Means for performing the functionality at block 1010 may comprise, for example, a bus 1105, processor(s) 1110, DSP 1120, wireless communication interface 1130, memory 1160, and/or other components of a mobile device 1100, as illustrated in FIG. 11 and discussed hereafter. Additionally or alternatively, means for performing the functionality block 1010 may comprise, for example, a bus 1205, processors 1210, communications subsystem 1230 (optionally including wireless communications interface 1233), memory 1235, and/or other components of a computer system 1200, as illustrated in FIG. 12 and discussed hereafter.

At block 1020, the functionality comprises, assigning a reference orbital dataset of the plurality orbital datasets determined at a reference time point to corresponding control boxes of a reference grid, as described with respect to FIG. 9, block 910. According to some embodiments, a snapshot of the historical data may be selected as the reference orbital dataset for mapping and each TLE in the snapshot may be assigned to a corresponding control box of the reference grid respectively. Alternatively, epoch time of TLE assigned to each control box can be anywhere within or near the time period spanned by the historical orbital data collected in block 1010.

Means for performing the functionality at block 1020 may comprise, for example, a bus 1105, processor(s) 1110, DSP 1120, wireless communication interface 1130, memory 1160, and/or other components of a mobile device 1100, as illustrated in FIG. 11 and discussed hereafter. Additionally or alternatively, means for performing the functionality block 1010 may comprise, for example, a bus 1205, processors 1210, communications subsystem 1230 (optionally including wireless communications interface 1233), memory 1235, and/or other components of a computer system 1200, as illustrated in FIG. 12 and discussed hereafter.

At block 1030, the functionality comprises mapping the plurality set of orbital data to the reference grid based on the assignment of the reference orbital dataset. As described with respect to FIG. 9, the mapping may comprise mapping a first candidate orbital dataset of the plurality orbital datasets to the reference grid based on the assignment of the reference orbital dataset, where the first candidate orbital dataset is determined at a first candidate time point different from the reference time point. For example, with respect to blocks 915-960 in FIG. 9, a first candidate TLE($t_c$) of a first candidate dataset (e.g., the first candidate snapshot) determined at time point $t_c$ may be selected. In some embodiments, the first candidate time point $t_c$ may be a closest time point measured in time to the reference time point $t_{ref}$ among the different time points when the different datasets of the plurality of orbital datasets are determined (e.g., among all epoch times).

In some embodiments, whether the first candidate TLE($t_c$) is already mapped to the reference grid (e.g., if the first candidate TLE($t_c$) is mapped to one of the control boxes of the reference grid) may be determined. In some embodiments, if the first candidate TLE($t_c$) is already mapped to the reference grid, a next/second candidate TLE($t_{c-1}$) of a second candidate dataset (e.g., the second candidate snapshot) determined at time point $t_{c-1}$ may be selected, where the first candidate time point to is earlier in time than the reference time point $t_{ref}$ (e.g., the mapping process goes backwards in time). Otherwise, if the first candidate time point to is later in time than the reference time point $t_{ref}$ (e.g., the mapping process goes forwards in time), a next/second candidate TLE($t_{c+1}$) of a second candidate dataset (e.g., the second candidate snapshot) determined at time point $t_{c+1}$ may be selected. Accordingly, the second candidate TLE($t_{c-1}$) may replace the first candidate TLE($t_c$) (e.g., the first candidate TLE($t_c$) may be updated with the second candidate TLE($t_{c-1}$)) for finishing the rest portion of the process.

If the first candidate TLE($t_c$) is not yet mapped to the reference grid, a first set of orbital parameter values (e.g., right ascension of ascending node (RAAN) and/or argument of latitude) for the first candidate time point to may be determined based on the reference TLE($t_{ref}$). For example, the reference TLE$_{ref}$ may be propagated to the first candidate time point to $t_c$ calculate the orbital parameter values corresponding to the first candidate time point $t_c$. In parallel, a second set of orbital parameter values (e.g., RAAN and/or argument of latitude) for the first candidate time point to may be determined based on the first candidate TLE($t_c$). For example, the orbital parameter values corresponding to the first candidate time point to may be determined using the first candidate TLE($t_c$).

The first and the second sets of orbital parameter values may be compared to see if the two sets of orbital parameter values align (e.g., if the difference between the two sets of orbital parameter values is below a predetermined threshold). For example, the first and the second sets of orbital parameter values align, the two comparing TLE data (e.g., the reference TLE($t_{ref}$) and the first candidate TLE($t_c$)) may correspond to a same control box. Accordingly, the first candidate TLE($t_c$) may be mapped to the first control box which the reference TLE($t_{ref}$) was assigned to. In this case, the reference TLE($t_{ref}$) may be updated with the first candidate TLE($t_c$), and the first candidate TLE($t_c$) may be used as the new reference TLE (also using the first candidate time point to as the updated reference time point $t_{ref}$ and using the snapshot taken at using the first candidate time point to as the updated dataset) for further processing. After updating the reference data (e.g., the reference TLE($t_{ref}$), the reference time point $t_{ref}$, and the reference dataset whether there is a next candidate TLE dataset (e.g., a snapshot taken at a next time point) exists in the historical data may be determined. If the determination is no, meaning that the mapping process has traversed the historical data at least in one time direction (e.g., in forward or backward direction), the process ends (e.g., either completely ends the mapping process or goes back to the original reference data and mapping the historical data in an opposite time direction). If the determination is yes, the mapping process may be repeated using the updated reference data.

If the first and the second sets of orbital parameter values do not align, whether the process ends, or repeats will be determined. Accordingly, when the process ends, all the historical data received by the server may be mapped to the corresponding control box of the reference grid.

The historical data mapped to the reference grid may then be input to block 610 of FIG. 6 for the estimation process (e.g., step 2 in FIG. 6). As noted above, it is contemplated that the control box positions computed using the historical data mapped to the reference grid may be rotated from ECI to ECEF after being mapped to the reference grid, or when received by the server (e.g., the orbital model of the historical data received by server already results in control box positions in ECEF coordinates).

Means for performing the functionality at block 1030 may comprise, for example, a bus 1105, processor(s) 1110, DSP 1120, wireless communication interface 1130, memory 1160, and/or other components of a mobile device 1100, as illustrated in FIG. 11 and discussed hereafter. Additionally or alternatively, means for performing the functionality block 1030 may comprise, for example, a bus 1205, processors 1210, communications subsystem 1230 (optionally including wireless communications interface 1233), memory 1235, and/or other components of a computer system 1200, as illustrated in FIG. 12 and discussed hereafter.

By sorting the historical data by the epoch time of the data, where the orbital parameter values determined based on the candidate data that is the closest in time to the reference time point are compared with orbital parameter values propagated from the reference data to the candidate time point (e.g., determine orbital parameter values for to using the reference $TLE(t_{ref})$), the mapping techniques disclosed herein may minimize the data propagation error when creating historical data for the control boxes using the historical data (e.g., mapping the historical data to the reference grid).

FIG. 11 is a block diagram of an embodiment of a mobile device 1100, which can be utilized as described herein above (e.g., in association with FIGS. 1-12). For example, the mobile device 1100 can perform one or more of the functions of the method shown in FIG. 10. It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 11.

The mobile device 1100 is shown comprising hardware elements that can be electrically coupled via a bus 1105 (or may otherwise be in communication, as appropriate). The hardware elements may include a processor(s) 1110 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1110 may comprise one or more processing units, which may be housed in a single integrated circuit (IC) or multiple ICs. As shown in FIG. 11, some embodiments may have a separate DSP 1120, depending on desired functionality. Location determination and/or other determinations based on wireless communication may be provided in the processor(s) 1110 and/or wireless communication interface 1130 (discussed below). The mobile device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The mobile device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1100 to communicate with other devices as described in the embodiments above. The wireless communication interface 1130 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof. The antenna(s) 1132 may be capable of transmitting and receiving wireless signals using beams (e.g., Tx beams and Rx beams). Beam formation may be performed using digital and/or analog beam formation techniques, with respective digital and/or analog circuitry. The wireless communication interface 1130 may include such circuitry. As shown in FIG. 3, the antenna(s) 1132 may further be used for satellite-based communication and may comprise a primary note, which may be pointed a satellite for satellite-based communication, as described herein. According to some embodiments, the orientation of the primary note relative to the body of the device may be known/established by the device manufacturer.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1100 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1100 can further include sensor(s) 1140. Sensor(s) 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 1100 may also include a Global Navigation Satellite System (GNSS) receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the mobile device 1100, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS), and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1110, DSP 1120, and/or a processor within the wireless communication interface 1130 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1110 or DSP 1120.

The mobile device 1100 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile device 1100 (and/or processor(s) 1110 or DSP 1120 within mobile device 1100). In some embodiments, then, such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of one or more network components as described in the embodiments herein (e.g., data source(s) 530 and/or server 520 FIG. 5). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers that may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of facilitating pointing of a mobile device at a satellite of a satellite constellation for satellite-based data communication, according to this disclosure, may comprise obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points. The method may also comprise assigning a reference orbital dataset of the plurality orbital datasets determined at a reference time point to corresponding control boxes of a reference grid covering the satellite constellation, wherein each control box of the reference grid corresponds to a satellite of the satellite constellation. The method may also comprise mapping the plurality orbital datasets to the reference grid for an orbital model based on the assignment of the reference orbital dataset Clause 2. The clause of clause 1, wherein assigning the reference orbital dataset to the corresponding control boxes further comprises: assigning a first orbital data of the reference orbital dataset, to a first control box of the reference grid.

Clause 3. The clauses of clauses of 1 and 2, wherein mapping the plurality orbital datasets to the reference grid based on the assignment of the reference orbital dataset further comprises: mapping a first candidate orbital dataset of the plurality orbital datasets to the reference grid based on the assignment of the reference orbital dataset, wherein the first candidate orbital dataset is determined at a first candidate time point different from the reference time point.

Clause 4. The clauses of clauses of 1-3, wherein mapping the first candidate orbital dataset comprises: determining, based on the first orbital data, a first set of orbital parameter values of a satellite corresponding to a second orbital data of the first candidate orbital dataset for the first candidate time point; determining, based on the second orbital data, a second set of orbital parameter values of a satellite corresponding to the second orbital data for the first candidate time point; determining if a difference between the first set of orbital parameter values and the second set of orbital parameter values is below a predetermined threshold; and mapping the second orbital data to the first control box in response to a determination that the difference is below the predetermined threshold.

Clause 5. The clauses of clauses of 1-4 further comprising: prior to determining based on the first orbital data, the first set of orbital parameter values of the first satellite for the first candidate time point, determining if the second orbital data is mapped to a control box of the reference grid; and in response to determining the second orbital data is mapped, mapping a second candidate orbital dataset of the plurality orbital datasets to the reference grid based on the assignment of the reference orbital dataset, wherein the second candidate orbital dataset is determined at a second candidate time point having a longer interval from the reference time point than the first candidate time point.

Clause 6. The clauses of clauses of 1-5 further comprising: in response to determining the difference between the first set of orbital parameter values and the second set of orbital parameter values is below a predetermined threshold, mapping the second candidate dataset to the reference grid based on the assignment of the reference orbital dataset.

Clause 7. The clauses of clauses of 1-6, wherein the first candidate time point is a closest time point measured in time to the reference time point among the different time points when the different datasets of the plurality of orbital datasets are determined.

Clause 8. The clauses of clauses of 1-7, wherein the first candidate time point is earlier in time than the reference time point.

Clause 9. The clauses of clauses of 1-8, wherein the first candidate time point is later in time than the reference time point.

Clause 10. The clauses of clauses of 1-9, wherein an interval between two consecutive time points of the different time points when the different datasets of the plurality of orbital datasets are determined is less than about a week.

Clause 11. The clauses of clauses of 1-10 further comprises: updating the reference time point and the reference orbital dataset with the first candidate time point and the first candidate orbital dataset respectively.

Clause 12. The clauses of clauses of 1-11, wherein the first set and second set of orbital parameter values correspond to a set of orbital parameters comprising right ascension of ascending node (RAAN) and argument of latitude.

Clause 13. The clauses of clauses of 1-12, wherein obtaining the historical orbital data comprises: obtaining archived Two Line Element (TLE) data of the plurality of satellites for the period of time; and transforming the mapped plurality orbital datasets from an earth centered inertial (ECI) reference frame to an earth-centered, earth-fixed (ECEF) frame.

Clause 14. The clauses of clauses of 1-13, further comprising: determining orbital assistance data based on the mapped plurality orbital datasets in ECEF frame, wherein the orbital model comprises a Keplerian orbital model with a set of Keplerian parameter values, and wherein the set of Keplerian parameter comprises: eccentricity, mean anomaly, inclination angle, Right Ascension of Ascending Node (RAAN), RAAN rate, a combination thereof.

Clause 15. The clauses of clauses of 1-14, further comprising transmitting assistance data indicating of the mapped plurality orbital datasets to at least one user equipment (UE).

Clause 16. An example device for facilitating pointing of a mobile device at a satellite of a satellite constellation for satellite-based data communication, according to this disclosure, may comprise a transceiver, a memory, one or more processors communicatively coupled with the transceiver and the memory, wherein the one or more processors are configured to obtain, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points. The one or more processors may also be configured to assign a reference orbital dataset of the plurality orbital datasets determined at a reference time point to corresponding control boxes of a reference grid covering the satellite constellation, wherein each control box of the reference grid corresponds to a satellite of the satellite constellation. The one or more processors may also be configured to map the plurality orbital datasets to the reference grid for an orbital model based on the assignment of the reference orbital dataset.

Clause 17. The clause of clauses 16, wherein to assign the reference orbital dataset to the corresponding control boxes, the one or more processors are further configured to: assign a first orbital data of the reference orbital dataset, to a first control box of the reference grid.

Clause 18. The clauses of clauses of 16 and 17, wherein to map the plurality orbital datasets to the reference grid based on the assignment of the reference orbital dataset, the one or more processors are further configured to: map a first candidate orbital dataset of the plurality orbital datasets to the reference grid based on the assignment of the reference orbital dataset, wherein the first candidate orbital dataset is determined at a first candidate time point different from the reference time point.

Clause 19. The clauses of clauses of 16-18, wherein to map the first candidate orbital dataset, the one or more processors are further configured to: determine, based on the first orbital data, a first set of orbital parameter values of a satellite corresponding to a second orbital data of the first candidate orbital dataset for the first candidate time point; determine, based on the second orbital data, a second set of orbital parameter values of a satellite corresponding to the second orbital data for the first candidate time point; determine if a difference between the first set of orbital parameter values and the second set of orbital parameter values is below a predetermined threshold; and map the second orbital data to the first control box in response to a determination that the difference is below the predetermined threshold.

Clause 20. The clauses of clauses of 16-19, wherein the one or more processors are further configured to: prior to determining based on the first orbital data, the first set of orbital parameter values of the first satellite for the first candidate time point, determine if the second orbital data is mapped to a control box of the reference grid; and in response to determining the second orbital data is mapped, map a second candidate orbital dataset of the plurality orbital datasets to the reference grid based on the assignment of the reference orbital dataset, wherein the second candidate orbital dataset is determined at a second candidate time point having a longer interval from the reference time point than the first candidate time point.

Clause 21. The clauses of clauses of 16-20, wherein the one or more processors are further configured to: in response to determining the difference between the first set of orbital parameter values and the second set of orbital parameter values is below a predetermined threshold, map the second candidate dataset to the reference grid based on the assignment of the reference orbital dataset.

Clause 22. The clauses of clauses of 16-21, wherein the first candidate time point is a closest time point measured in time to the reference time point among the different time points when the different datasets of the plurality of orbital datasets are determined.

Clause 23. The clauses of clauses of 16-22, wherein the first candidate time point is earlier in time than the reference time point.

Clause 24. The clauses of clauses of 16-23, wherein the first candidate time point is later in time than the reference time point.

Clause 25. The clauses of clauses of 16-24, wherein an interval between two consecutive time points of the different time points when the different datasets of the plurality of orbital datasets are determined is less than about a week.

Clause 26. The clauses of clauses of 16-25, wherein the one or more processors are further configured to: update the reference time point and the reference orbital dataset with the first candidate time point and the first candidate orbital dataset respectively.

Clause 27. The clauses of clauses of 16-26, wherein the first set and second set of orbital parameter values correspond to a set of orbital parameters comprising right ascension of ascending node (RAAN) and argument of latitude.

Clause 28. The clauses of clauses of 16-27, wherein the one or more processors are further configured to: transmit assistance data indicating of the mapped plurality orbital datasets to at least one user equipment (UE).

Clause 29. An apparatus for facilitating pointing of a mobile device at a satellite of a satellite constellation for satellite-based data communication, the apparatus comprising means for obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points; means for assigning a reference orbital dataset of the plurality orbital datasets determined at a reference time point to corresponding control boxes of a reference grid covering the satellite constellation, wherein each control box of the reference grid corresponds to a satellite of the satellite constellation; and means for mapping the plurality orbital datasets to the reference grid for an orbital model based on the assignment of the reference orbital dataset.

Clause 30. The clause of clauses 29, wherein the means for assigning the reference orbital dataset to the corresponding control boxes further comprises code for: means for assigning a first orbital data of the reference orbital dataset, to a first control box of the reference grid.

Clause 31. The clauses of clauses 29 and 30, wherein the means for mapping the plurality orbital datasets to the reference grid based on the assignment of the reference orbital dataset further comprises: means for mapping a first candidate orbital dataset of the plurality orbital datasets to the reference grid based on the assignment of the reference orbital dataset, wherein the first candidate orbital dataset is determined at a first candidate time point different from the reference time point.

Clause 32. The clauses of clauses 29-31, wherein the means for mapping the first candidate orbital dataset comprises: means for determining, based on the first orbital data, a first set of orbital parameter values of a satellite corresponding to a second orbital data of the first candidate orbital dataset for the first candidate time point; means for determining, based on the second orbital data, a second set of orbital parameter values of a satellite corresponding to the second orbital data for the first candidate time point; means for determining if a difference between the first set of orbital parameter values and the second set of orbital parameter values is below a predetermined threshold; and means for mapping the second orbital data to the first control box in response to a determination that the difference is below the predetermined threshold.

Clause 33. The clauses of clauses 29-32, further comprises: means for transmitting assistance data indicating of the mapped plurality orbital datasets to at least one user equipment (UE).

Clause 34. An example non-transitory computer-readable medium stores instructions for facilitating pointing of a mobile device at a satellite of a satellite constellation for satellite-based data communication, the instructions comprising code for obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points. The instructions further may comprise code for assigning a reference orbital dataset of the plurality orbital datasets determined at a reference time point to corresponding control boxes of a reference grid covering the satellite constellation, wherein each control box of the reference grid corresponds to a satellite of the satellite constellation. T The instructions further may comprise code for mapping the plurality orbital datasets to the reference grid for an orbital model based on the assignment of the reference orbital dataset.

What is claimed is:

1. A method of satellite positioning for satellite-based data communication, the method comprising:
   obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points;
   assigning a reference orbital dataset of the plurality orbital datasets determined at a reference time point to corresponding control boxes of a reference grid covering the satellite constellation, wherein each control box of the reference grid corresponds to a satellite of the satellite constellation; and
   mapping the plurality orbital datasets to the reference grid for an orbital model based on the assignment of the reference orbital dataset.

2. The method of claim 1, wherein assigning the reference orbital dataset to the corresponding control boxes further comprises:
   assigning a first orbital data of the reference orbital dataset, to a first control box of the reference grid.

3. The method of claim 2, wherein mapping the plurality orbital datasets to the reference grid based on the assignment of the reference orbital dataset further comprises:
   mapping a first candidate orbital dataset of the plurality orbital datasets to the reference grid based on the assignment of the reference orbital dataset, wherein the first candidate orbital dataset is determined at a first candidate time point different from the reference time point.

4. The method of claim 3, wherein mapping the first candidate orbital dataset comprises:
   determining, based on the first orbital data, a first set of orbital parameter values of a satellite corresponding to a second orbital data of the first candidate orbital dataset for the first candidate time point;
   determining, based on the second orbital data, a second set of orbital parameter values of a satellite corresponding to the second orbital data for the first candidate time point;
   determining if a difference between the first set of orbital parameter values and the second set of orbital parameter values is below a predetermined threshold; and
   mapping the second orbital data to the first control box in response to a determination that the difference is below the predetermined threshold.

5. The method of claim 4 further comprising:
   prior to determining based on the first orbital data, the first set of orbital parameter values of the first satellite for the first candidate time point, determining if the second orbital data is mapped to a control box of the reference grid; and
   in response to determining the second orbital data is mapped, mapping a second candidate orbital dataset of the plurality orbital datasets to the reference grid based on the assignment of the reference orbital dataset, wherein the second candidate orbital dataset is determined at a second candidate time point having a longer interval from the reference time point than the first candidate time point.

6. The method of claim 5 further comprising:
   in response to determining the difference between the first set of orbital parameter values and the second set of orbital parameter values is below a predetermined threshold, mapping the second candidate dataset to the reference grid based on the assignment of the reference orbital dataset.

7. The method of claim 6, wherein the first candidate time point is a closest time point measured in time to the reference time point among the different time points when the different datasets of the plurality of orbital datasets are determined.

8. The method of claim 6, wherein the first candidate time point is earlier in time than the reference time point.

9. The method of claim 6, wherein the first candidate time point is later in time than the reference time point.

10. The method of claim 6, wherein an interval between two consecutive time points of the different time points when the different datasets of the plurality of orbital datasets are determined is less than about a week.

11. The method of claim 4 further comprises:
    updating the reference time point and the reference orbital dataset with the first candidate time point and the first candidate orbital dataset respectively.

12. The method of claim 4, wherein the first set and second set of orbital parameter values correspond to a set of orbital parameters comprising right ascension of ascending node (RAAN) and argument of latitude.

13. The method of claim 1, wherein obtaining the historical orbital data comprises:
    obtaining archived Two Line Element (TLE) data of the plurality of satellites for the period of time; and
    transforming the mapped plurality orbital datasets from an earth centered inertial (ECI) reference frame to an earth-centered, earth-fixed (ECEF) frame.

14. The method of claim 13 further comprising:
    determining orbital assistance data based on the mapped plurality orbital datasets in ECEF frame, wherein the orbital model comprises a Keplerian orbital model with a set of Keplerian parameter values, and wherein the set of Keplerian parameter comprises:
    eccentricity,
    mean anomaly,
    inclination angle,
    Right Ascension of Ascending Node (RAAN),
    RAAN rate,
    a combination thereof.

15. The method of claim 1 further comprising:
    transmitting assistance data indicating of the mapped plurality orbital datasets to at least one user equipment (UE).

16. A device for facilitating pointing of a mobile device at a satellite of a satellite constellation for satellite-based data communication, the device comprising:
    a transceiver;
    a memory; and
    one or more processors communicatively coupled with the transceiver and the memory, wherein the one or more processors are configured to:
    obtain, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points;

assign a reference orbital dataset of the plurality orbital datasets determined at a reference time point to corresponding control boxes of a reference grid covering the satellite constellation, wherein each control box of the reference grid corresponds to a satellite of the satellite constellation; and map the plurality orbital datasets to the reference grid for an orbital model based on the assignment of the reference orbital dataset.

17. The device of claim 16, wherein to assign the reference orbital dataset to the corresponding control boxes, the one or more processors are further configured to:
assign a first orbital data of the reference orbital dataset, to a first control box of the reference grid.

18. The device of claim 17, wherein to map the plurality orbital datasets to the reference grid based on the assignment of the reference orbital dataset, the one or more processors are further configured to:
map a first candidate orbital dataset of the plurality orbital datasets to the reference grid based on the assignment of the reference orbital dataset, wherein the first candidate orbital dataset is determined at a first candidate time point different from the reference time point.

19. The device of claim 18, wherein to map the first candidate orbital dataset, the one or more processors are further configured to:
determine, based on the first orbital data, a first set of orbital parameter values of a satellite corresponding to a second orbital data of the first candidate orbital dataset for the first candidate time point;
determine, based on the second orbital data, a second set of orbital parameter values of a satellite corresponding to the second orbital data for the first candidate time point;
determine if a difference between the first set of orbital parameter values and the second set of orbital parameter values is below a predetermined threshold; and
map the second orbital data to the first control box in response to a determination that the difference is below the predetermined threshold.

20. The device of claim 19, wherein the one or more processors are further configured to:
prior to determining based on the first orbital data, the first set of orbital parameter values of the first satellite for the first candidate time point, determine if the second orbital data is mapped to a control box of the reference grid; and
in response to determining the second orbital data is mapped, map a second candidate orbital dataset of the plurality orbital datasets to the reference grid based on the assignment of the reference orbital dataset, wherein the second candidate orbital dataset is determined at a second candidate time point having a longer interval from the reference time point than the first candidate time point.

21. The device of claim 20, wherein the one or more processors are further configured to:
in response to determining the difference between the first set of orbital parameter values and the second set of orbital parameter values is below a predetermined threshold, map the second candidate dataset to the reference grid based on the assignment of the reference orbital dataset.

22. The device of claim 21, wherein the first candidate time point is a closest time point measured in time to the reference time point among the different time points when the different datasets of the plurality of orbital datasets are determined.

23. The device of claim 21, wherein the first candidate time point is earlier in time than the reference time point.

24. The device of claim 21, wherein the first candidate time point is later in time than the reference time point.

25. The device of claim 21, wherein an interval between two consecutive time points of the different time points when the different datasets of the plurality of orbital datasets are determined is less than about a week.

26. The device of claim 19, wherein the one or more processors are further configured to: update the reference time point and the reference orbital dataset with the first candidate time point and the first candidate orbital dataset respectively.

27. The device of claim 19, wherein the first set and second set of orbital parameter values correspond to a set of orbital parameters comprising right ascension of ascending node (RAAN) and argument of latitude.

28. The device of claim 16, wherein the one or more processors are further configured to:
transmit assistance data indicating of the mapped plurality orbital datasets to at least one user equipment (UE).

29. An apparatus for facilitating pointing of a mobile device at a satellite of a satellite constellation for satellite-based data communication, the apparatus comprising:
means for obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points;
means for assigning a reference orbital dataset of the plurality orbital datasets determined at a reference time point to corresponding control boxes of a reference grid covering the satellite constellation, wherein each control box of the reference grid corresponds to a satellite of the satellite constellation; and
means for mapping the plurality orbital datasets to the reference grid for an orbital model based on the assignment of the reference orbital dataset.

30. The apparatus of claim 29, wherein the means for assigning the reference orbital dataset to the corresponding control boxes further comprises code for:
means for assigning a first orbital data of the reference orbital dataset, to a first control box of the reference grid.

31. The apparatus of claim 30, wherein the means for mapping the plurality orbital datasets to the reference grid based on the assignment of the reference orbital dataset further comprises:
means for mapping a first candidate orbital dataset of the plurality orbital datasets to the reference grid based on the assignment of the reference orbital dataset, wherein the first candidate orbital dataset is determined at a first candidate time point different from the reference time point.

32. The apparatus of claim 31, wherein the means for mapping the first candidate orbital dataset comprises:
means for determining, based on the first orbital data, a first set of orbital parameter values of a satellite corresponding to a second orbital data of the first candidate orbital dataset for the first candidate time point;

means for determining, based on the second orbital data, a second set of orbital parameter values of a satellite corresponding to the second orbital data for the first candidate time point;

means for determining if a difference between the first set of orbital parameter values and the second set of orbital parameter values is below a predetermined threshold; and means for mapping the second orbital data to the first control box in response to a determination that the difference is below the predetermined threshold.

33. The apparatus of claim 29 further comprises:

means for transmitting assistance data indicating of the mapped plurality orbital datasets to at least one user equipment (UE).

34. A non-transitory computer-readable medium storing instructions for facilitating pointing of a mobile device at a satellite of a satellite constellation for satellite-based data communication, the instructions comprising code for:

obtaining, at a first time point, historical orbital data indicative of orbital movement of a plurality of satellites of a satellite constellation over a period of time, wherein the historical orbital data comprises a plurality orbital datasets, wherein each dataset of the plurality orbital datasets comprises a plurality of orbital data corresponding to different satellites of the satellite constellation, and wherein the different datasets of the plurality orbital datasets are determined at different time points;

assigning a reference orbital dataset of the plurality orbital datasets determined at a reference time point to corresponding control boxes of a reference grid covering the satellite constellation, wherein each control box of the reference grid corresponds to a satellite of the satellite constellation; and mapping the plurality orbital datasets to the reference grid for an orbital model based on the assignment of the reference orbital dataset.

\* \* \* \* \*